United States Patent
Song et al.

(10) Patent No.: US 12,056,395 B2
(45) Date of Patent: Aug. 6, 2024

(54) TECHNIQUES FOR PARTIAL WRITES

(71) Applicant: Micron Technology, Inc., Boise, ID (US)

(72) Inventors: Taeksang Song, San Jose, CA (US); Chinnakrishnan Ballapuram, San Jose, CA (US); Saira Samar Malik, Lafayette, IN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/456,994

(22) Filed: Nov. 30, 2021

(65) Prior Publication Data

US 2022/0188029 A1    Jun. 16, 2022

Related U.S. Application Data

(60) Provisional application No. 63/125,827, filed on Dec. 15, 2020.

(51) Int. Cl.
*G06F 3/06* (2006.01)
*G06F 12/02* (2006.01)
*G06F 12/0868* (2016.01)

(52) U.S. Cl.
CPC .......... *G06F 3/0659* (2013.01); *G06F 3/0604* (2013.01); *G06F 3/0656* (2013.01); *G06F 3/0673* (2013.01); *G06F 12/0238* (2013.01); *G06F 12/0868* (2013.01)

(58) Field of Classification Search
None
See application file for complete search history.

(56) References Cited

U.S. PATENT DOCUMENTS

| | | | | |
|---|---|---|---|---|
| 6,748,496 | B1 * | 6/2004 | Scarpino | G06F 12/0804 711/E12.04 |
| 2007/0041050 | A1 * | 2/2007 | Wang | G11C 7/1087 711/E12.008 |
| 2012/0221809 | A1 * | 8/2012 | Yoshikawa | G06F 3/0613 711/155 |
| 2012/0311180 | A1 * | 12/2012 | Barkey | G06F 13/385 709/238 |
| 2014/0136786 | A1 * | 5/2014 | Carpenter | G06F 9/466 711/125 |
| 2018/0096716 | A1 * | 4/2018 | Min | G11C 7/222 |
| 2019/0205244 | A1 * | 7/2019 | Smith | G06F 3/065 |
| 2022/0122650 | A1 * | 4/2022 | Eilert | G11C 11/40603 |

* cited by examiner

*Primary Examiner* — Charles Rones
*Assistant Examiner* — Ryan Dare
(74) *Attorney, Agent, or Firm* — Holland & Hart LLP

(57) ABSTRACT

Methods, systems, and devices for improved techniques for partial writes are described. A memory device may include a non-volatile memory and a volatile memory configured to operate as a cache for the non-volatile memory. The memory device may receive, from a host device, a write command for a first data set provided by the host device. Based on the write command, the memory device may store the first data set in a buffer coupled with a volatile memory. After storing the first data set in the buffer, the memory device may communicate to the volatile memory a set of data that includes the first data set and a second data set. The first data set and the second data may be associated with adjacent addresses for the volatile memory and may each have sizes smaller than a threshold size associated with the volatile memory.

25 Claims, 7 Drawing Sheets

TECHNIQUES FOR PARTIAL WRITES

CROSS REFERENCE

The present Application for Patent claims the benefit of U.S. Provisional Patent Application No. 63/125,827 by SONG et al., entitled "IMPROVED TECHNIQUES FOR PARTIAL WRITES," filed Dec. 15, 2020, assigned to the assignee hereof, and expressly incorporated by reference herein.

FIELD OF TECHNOLOGY

The following relates generally to one or more systems for memory and more specifically to improved techniques for partial writes.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

A device, such as an electronic device, may include a non-volatile memory (e.g., a primary memory for storing information among other operations) and a volatile memory (e.g., a secondary memory) that may, among other aspects, operate as a cache for the non-volatile memory. Such a configuration may allow the device to benefit from advantages of the non-volatile memory (e.g., non-volatility and persistent storage, high storage capacity, low power consumption) while maintaining compatibility with a host device through the volatile memory. When such a device receives a write command for data, the device may temporarily store the data in a buffer before communicating the data from the buffer to either the non-volatile memory or the volatile memory. If the data is sufficiently sized for the volatile memory, which may have a threshold size for access, the device may communicate the data to the volatile memory for storage; if the data is insufficiently sized (e.g., is too small) for the volatile memory, the device may communicate the data to the non-volatile memory for storage. But writing data to the non-volatile memory may take longer and consume more power than writing data to the volatile memory in some examples.

According to the techniques described herein, a device may combine two or more data sets of insufficient size (e.g., each smaller than a threshold size) for accessing the volatile memory so that the resulting data set has a sufficient size to enable accessing of the volatile memory. The device may combine the data sets based on, for example, the data sets being associated with adjacent memory addresses for the volatile memory. Upon communicating the data set to the volatile memory, the device may write the data set to the volatile memory, which may be faster and consume less power compared to writing the data set to the non-volatile memory in some examples.

Features of the disclosure are initially described in the context of a system and memory subsystem as described with reference to FIGS. 1 and 2. Features of the disclosure are described in the context of a device, as described with reference to FIG. 3, and a process flow, as described with reference to FIG. 4. These and other features of the disclosure are further illustrated by and described with reference to an apparatus diagram and flowcharts that relate to improved techniques for partial writes as described with reference to FIGS. 5-7.

Figure 1:
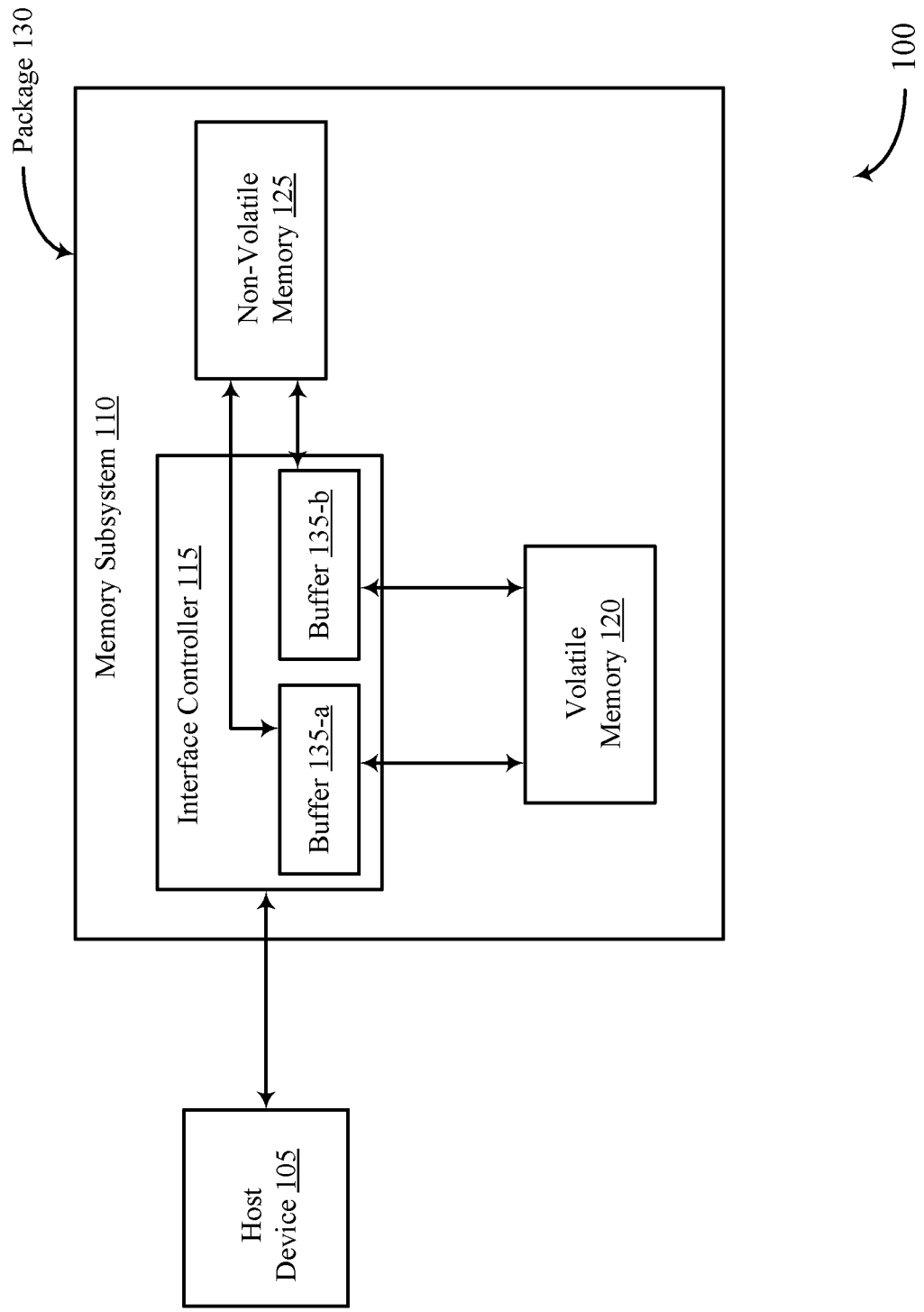
FIG. 1 illustrates an example of a system that supports improved techniques for partial writes in accordance with examples as disclosed herein.

FIG. 1 illustrates an example of a system 100 that supports improved techniques for partial writes in accordance with examples as disclosed herein.

The memory system 100 may be included in an electronic device such a computer or phone. The memory system 100 may include a host device 105 and a memory subsystem 110. The host device 105 may be a processor or system-on-a-chip (SoC) that interfaces with the interface controller 115 as well as other components of the electronic device that includes the memory system 100. The memory subsystem 110 may store and provide access to electronic information (e.g., digital information, data) for the host device 105. The memory subsystem 110 may include an interface controller 115, a volatile memory 120, and a non-volatile memory 125. In some examples, the interface controller 115, the volatile memory 120, and the non-volatile memory 125 may be included in a same physical package such as a package 130. However, the interface controller 115, the volatile memory 120, and the non-volatile memory 125 may be disposed on different, respective dies (e.g., silicon dies).

The devices in the memory system 100 may be coupled by various conductive lines (e.g., traces, printed circuit board (PCB) routing, redistribution layer (RDL) routing) that may enable the communication of information (e.g., commands, addresses, data) between the devices. The conductive lines may make up channels, data buses, command buses, address buses, and the like.

The memory subsystem 110 may be configured to provide the benefits of the non-volatile memory 125 while maintaining compatibility with a host device 105 that supports protocols for a different type of memory, such as the volatile memory 120, among other examples. For example, the non-volatile memory 125 may provide benefits (e.g., relative to the volatile memory 120) such as non-volatility, higher capacity, or lower power consumption. But the host device 105 may be incompatible or inefficiently configured with various aspects of the non-volatile memory 125. For instance, the host device 105 may support voltages, access latencies, protocols, page sizes, etc. that are incompatible with the non-volatile memory 125. To compensate for the incompatibility between the host device 105 and the non-volatile memory 125, the memory subsystem 110 may be configured with the volatile memory 120, which may be compatible with the host device 105 and serve as a cache for the non-volatile memory 125. Thus, the host device 105 may use protocols supported by the volatile memory 120 while benefitting from the advantages of the non-volatile memory 125.

In some examples, the memory system 100 may be included in, or coupled with, a computing device, electronic device, mobile computing device, or wireless device. The device may be a portable electronic device. For example, the device may be a computer, a laptop computer, a tablet computer, a smartphone, a cellular phone, a wearable device, an internet-connected device, or the like. In some examples, the device may be configured for bi-directional wireless communication via a base station or access point. In some examples, the device associated with the memory system 100 may be capable of machine-type communication (MTC), machine-to-machine (M2M) communication, or device-to-device (D2D) communication. In some examples, the device associated with the memory system 100 may be referred to as a user equipment (UE), station (STA), mobile terminal, or the like.

The host device 105 may be configured to interface with the memory subsystem 110 using a first protocol (e.g., low-power double data rate (LPDDR)) supported by the interface controller 115. Thus, the host device 105 may, in some examples, interface with the interface controller 115 directly and the non-volatile memory 125 and the volatile memory 120 indirectly. In alternative examples, the host device 105 may interface directly with the non-volatile memory 125 and the volatile memory 120. The host device 105 may also interface with other components of the electronic device that includes the memory system 100. The host device 105 may be or include an SoC, a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In some examples, the host device 105 may be referred to as a host.

The interface controller 115 may be configured to interface with the volatile memory 120 and the non-volatile memory 125 on behalf of the host device 105 (e.g., based on one or more commands or requests issued by the host device 105). For instance, the interface controller 115 may facilitate the retrieval and storage of data in the volatile memory 120 and the non-volatile memory 125 on behalf of the host device 105. Thus, the interface controller 115 may facilitate data transfer between various subcomponents, such as between at least some of the host device 105, the volatile memory 120, or the non-volatile memory 125. The interface controller 115 may interface with the host device 105 and the volatile memory 120 using the first protocol and may interface with the non-volatile memory 125 using a second protocol supported by the non-volatile memory 125.

The non-volatile memory 125 may be configured to store digital information (e.g., data) for the electronic device that includes the memory system 100. Accordingly, the non-volatile memory 125 may include an array or arrays of memory cells and a local memory controller configured to operate the array(s) of memory cells. In some examples, the memory cells may be or include FeRAM cells (e.g., the non-volatile memory 125 may be FeRAM). The non-volatile memory 125 may be configured to interface with the interface controller 115 using the second protocol that is different than the first protocol used between the interface controller 115 and the host device 105. In some examples, the non-volatile memory 125 may have a longer latency for access operations than the volatile memory 120. For example, retrieving data from the non-volatile memory 125 may take longer than retrieving data from the volatile memory 120. Similarly, writing data to the non-volatile memory 125 may take longer than writing data to the volatile memory 120. In some examples, the non-volatile memory 125 may have a smaller page size than the volatile memory 120, as described herein.

The volatile memory 120 may be configured to operate as a cache for one or more components, such as the non-volatile memory 125. For example, the volatile memory 120 may store information (e.g., data) for the electronic device that includes the memory system 100. Accordingly, the volatile memory 120 may include an array or arrays of memory cells and a local memory controller configured to operate the array(s) of memory cells. In some examples, the memory cells may be or include DRAM cells (e.g., the volatile memory may be DRAM). The non-volatile memory 125 may be configured to interface with the interface controller 115 using the first protocol that is used between the interface controller 115 and the host device 105.

In some examples, the volatile memory 120 may have a shorter latency for access operations than the non-volatile memory 125. For example, retrieving data from the volatile memory 120 may take less time than retrieving data from the non-volatile memory 125. Similarly, writing data to the volatile memory 120 may take less time than writing data to the non-volatile memory 125. In some examples, the volatile memory 120 may have a larger page size than the non-volatile memory 125. For instance, the page size of volatile memory 120 may be 2 kilobytes (2 kB) and the page size of non-volatile memory 125 may be 64 bytes (64B) or 128 bytes (128B).

Although the non-volatile memory 125 may be a higher-density memory than the volatile memory 120, accessing the non-volatile memory 125 may take longer than accessing the volatile memory 120 (e.g., due to different architectures and protocols, among other reasons). Accordingly, operating the volatile memory 120 as a cache may reduce latency in the memory system 100. As an example, an access request for data from the host device 105 may be satisfied relatively quickly by retrieving the data from the volatile memory 120 rather than from the non-volatile memory 125. To facilitate operation of the volatile memory 120 as a cache, the interface controller 115 may include multiple buffers 135. The buffers 135 may be disposed on the same die as the interface controller 115 and may be configured to temporarily store data for transfer between the volatile memory 120, the non-volatile memory 125, or the host device 105 (or any combination thereof) during one or more access operations (e.g., storage and retrieval operations).

An access operation may also be referred to as an access process or access procedure and may involve one or more sub-operations that are performed by one or more of the components of the memory subsystem 110. Examples of access operations may include storage operations in which data provided by the host device 105 is stored (e.g., written to) in the volatile memory 120 or the non-volatile memory 125 (or both), and retrieval operations in which data requested by the host device 105 is obtained (e.g., read) from the volatile memory 120 or the non-volatile memory 125 and is returned to the host device 105.

To store data in the memory subsystem 110, the host device 105 may initiate a storage operation (or "storage process") by transmitting a storage command (also referred to as a storage request, a write command, or a write request) to the interface controller 115. The storage command may target a set of non-volatile memory cells in the non-volatile memory 125. In some examples, a set of memory cells may also be referred to as a portion of memory. The host device 105 may also provide the data to be written to the set of non-volatile memory cells to the interface controller 115. The interface controller 115 may temporarily store the data in the buffer 135-*a*. After storing the data in the buffer 135-*a*, the interface controller 115 may transfer the data from the buffer 135-*a* to the volatile memory 120 or the non-volatile memory 125 or both. In write-through mode, the interface controller 115 may transfer the data to both the volatile memory 120 and the non-volatile memory 125. In write-back mode, the interface controller 115 may only transfer the data to the volatile memory 120 (with the data being transferred to the non-volatile memory 125 during a later eviction process).

In either mode, the interface controller 115 may identify an appropriate set of one or more volatile memory cells in the volatile memory 120 for storing the data associated with the storage command. To do so, the interface controller 115 may implement set-associative mapping in which each set (e.g., block) of one or more non-volatile memory cells in the non-volatile memory 125 may be mapped to multiple sets of volatile memory cells in the volatile memory 120. For instance, the interface controller 115 may implement n-way associative mapping which allows data from a set of non-volatile memory cells to be stored in one of n sets of volatile memory cells in the volatile memory 120. Thus, the interface controller 115 may manage the volatile memory 120 as a cache for the non-volatile memory 125 by referencing the n sets of volatile memory cells associated with a targeted set of non-volatile memory cells. As used herein, a "set" of objects may refer to one or more of the objects unless otherwise described or noted. Although described with reference to set-associative mapping, the interface controller 115 may manage the volatile memory 120 as a cache by implementing one or more other types of mapping such as direct mapping or associative mapping, among other examples.

After determining which n sets of volatile memory cells are associated with the targeted set of non-volatile memory cells, the interface controller 115 may store the data in one or more of the n sets of volatile memory cells. This way, a subsequent retrieval command from the host device 105 for the data can be efficiently satisfied by retrieving the data from the lower-latency volatile memory 120 instead of retrieving the data from the higher-latency non-volatile memory 125. The interface controller 115 may determine which of the n sets of the volatile memory 120 to store the data based on one or more parameters associated with the data stored in the n sets of the volatile memory 120, such as the validity, age, or modification status of the data. Thus, a storage command by the host device 105 may be wholly (e.g., in write-back mode) or partially (e.g., in write-through mode) satisfied by storing the data in the volatile memory 120. To track the data stored in the volatile memory 120, the interface controller 115 may store for one or more sets of volatile memory cells (e.g., for each set of volatile memory cells) a tag address that indicates the non-volatile memory cells with data stored in a given set of volatile memory cells.

To retrieve data from the memory subsystem 110, the host device 105 may initiate a retrieval operation (also referred to as a retrieval process) by transmitting a retrieval command (also referred to as a retrieval request, a read command, or a read request) to the interface controller 115. The retrieval command may target a set of one or more non-volatile memory cells in the non-volatile memory 125. Upon receiving the retrieval command, the interface controller 115 may check for the requested data in the volatile memory 120. For instance, the interface controller 115 may check for the requested data in the n sets of volatile memory cells associated with the targeted set of non-volatile memory cells. If one of the n sets of volatile memory cells stores the requested data (e.g., stores data for the targeted set of non-volatile memory cells), the interface controller 115 may transfer the data from the volatile memory 120 to the buffer 135-*a* (e.g., in response to determining that one of the n sets of volatile memory cells stores the requested data, as described in FIGS. 4 and 5) so that it can be transmitted to the host device 105.

In general, the term "hit" may be used to refer to the scenario where the volatile memory 120 stores data targeted by the host device 105. If then sets of one or more volatile memory cells do not store the requested data (e.g., the n sets of volatile memory cells store data for a set of non-volatile memory cells other than the targeted set of non-volatile memory cells), the interface controller 115 may transfer the requested data from the non-volatile memory 125 to the buffer 135-*a* (e.g., in response to determining that the n sets of volatile memory cells do not store the requested data, as described with reference to FIGS. 4 and 5) so that it can be transmitted to the host device 105. In general, the term "miss" may be used to refer to the scenario where the volatile memory 120 does not store data targeted by the host device 105.

More specifically, a write hit may refer to the scenario where data in the volatile memory 120 is associated with (e.g., matches data stored at) a non-volatile memory address targeted by a write command from the host device; whereas a write miss may refer to the scenario where data associated with the non-volatile memory address is absent from the volatile memory 120.

In a miss scenario, after transferring the requested data to the buffer 135-*a*, the interface controller 115 may transfer the requested data from the buffer 135-*a* to the volatile memory 120 so that subsequent read requests for the data can be satisfied by the volatile memory 120 instead of the non-volatile memory 125. For example, the interface controller 115 may store the data in one of the n sets of volatile memory cells associated with the targeted set of non-volatile memory cells. But the n sets of volatile memory cells may already be storing data for other sets of non-volatile memory cells. So, to preserve this other data, the interface controller 115 may transfer the other data to the buffer 135-*b* so that it can be transferred to the non-volatile memory 125 for storage. Such a process may be referred to as "eviction" and the data transferred from the volatile memory 120 to the buffer 135-*b* may be referred to as "victim" data. In some cases, the interface controller 115 may transfer a subset of the victim data from the buffer 135-*b* to the non-volatile memory 125. For example, the interface controller 115 may transfer one or more subsets of victim data that have changed since the data was initially stored in the non-volatile memory 125. Data that is inconsistent between the volatile memory 120 and the non-volatile memory 125 (e.g., due to an update in one memory and not the other) may be referred to in some cases as "modified" or "dirty" data. In some examples (e.g., when interface controller operates in one mode such as a write-back mode), dirty data may be data that is present in the volatile memory 120 but not present in the non-volatile memory 125.

In some examples, the volatile memory 120 may be associated with a threshold size (or "cacheline" size) that defines the minimum granularity of data for accessing the volatile memory, or the minimum granularity of data for which dirty information is maintained, or both. For example, the volatile memory 120 may have a threshold size of 64B, meaning that information, such as validity information and dirty information, is stored on a 64B basis and that at least 64B of data is implicated per access procedure (e.g., per read/write operation). So, volatile memory 120 may expect access requests from other components to comply with (e.g., to equal) the threshold size of the volatile memory 120.

But the host device 105 may issue commands for different sizes of data, some of which may not satisfy the threshold size of the volatile memory 120. For example, the host device 105 may issue write commands for 32B of data despite the volatile memory 120 having a threshold size of 64B. A write command for data smaller than the threshold size of the volatile memory 120 may be referred to as a partial write command or partial write, whereas a write command for data that satisfies the threshold size may be referred to as a complete write command or complete write. When the interface controller 115 receives a partial write command that is a miss, the interface controller 115 may communicate the associated write data from the buffer 135-*a* to the non-volatile memory 125 (e.g., because the data is too small for the volatile memory 120). But writing the data to the non-volatile memory 125 instead of the volatile memory 120 may be disadvantageous in some examples, e.g., because the latency and power consumption associated with writing to the non-volatile memory 125 may greater than the latency and power consumption associated with writing to the volatile memory 120.

According to the techniques described herein, the interface controller 115 may efficiently handle a partial write command by combining the data from the partial write command with additional data so that that the resulting combination satisfies the threshold size of the volatile memory. With the threshold size satisfied, the interface controller 115 can communicate the combined data set to the volatile memory 120 instead of the non-volatile memory 125, which may reduce latency and conserve power. A write request may also be referred to herein as a write command, a storage command, or other suitable terminology.

Figure 2:
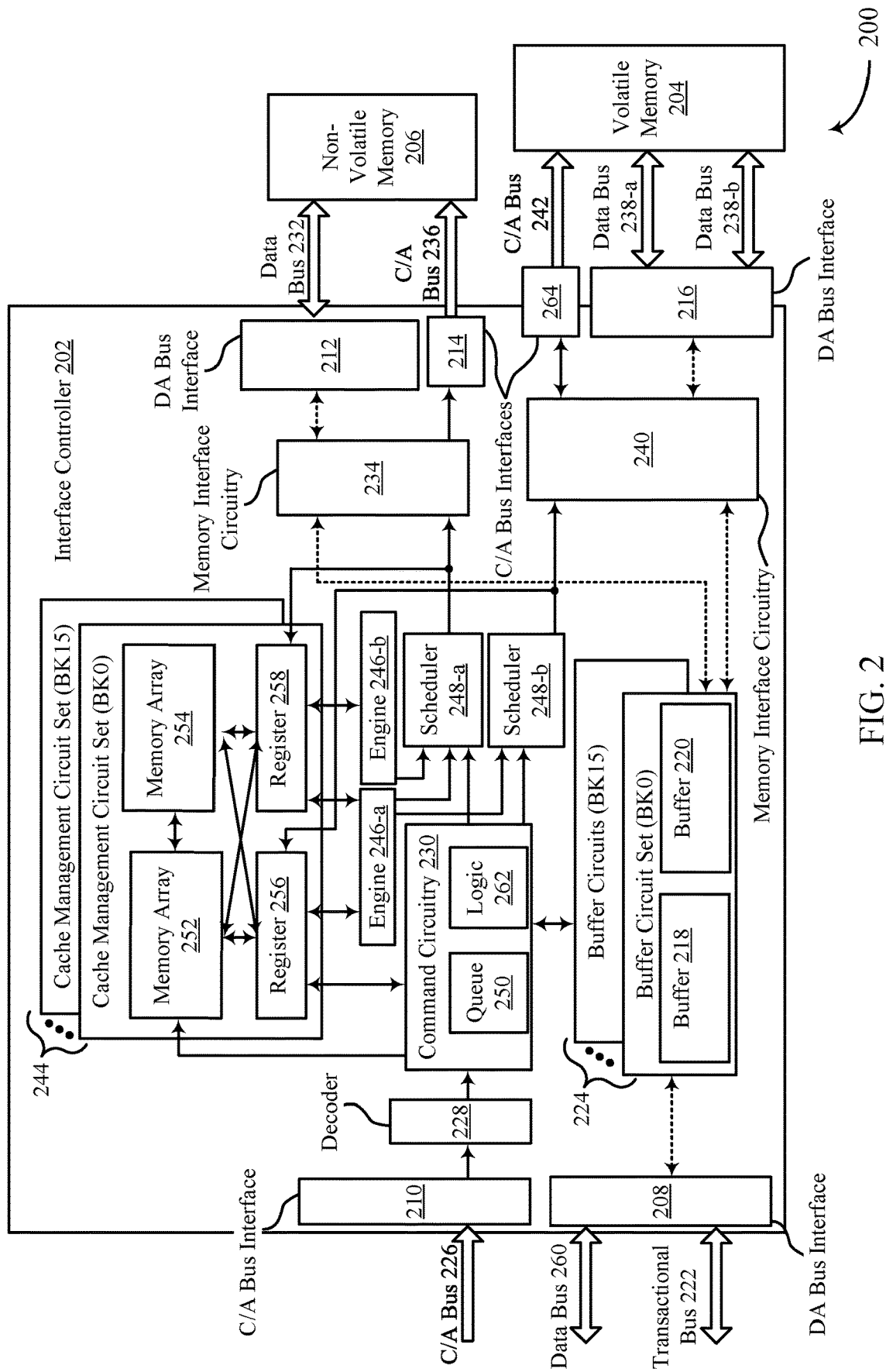
FIG. 2 illustrates an example of a memory subsystem that supports improved techniques for partial writes in accordance with examples as disclosed herein.

FIG. 2 illustrates an example of a memory subsystem 200 that supports improved techniques for partial writes in accordance with examples as disclosed herein. The memory subsystem 200 may be an example of the memory subsystem 110 described with reference to FIG. 1. Accordingly, the memory subsystem 200 may interact with a host device as described with reference to FIG. 1. The memory subsystem 200 may include an interface controller 202, a volatile memory 204, and a non-volatile memory 206, which may be examples of the interface controller 115, the volatile memory 120, and the non-volatile memory 125, respectively, as described with reference to FIG. 1. Thus, the interface controller 202 may interface with the volatile memory 204 and the non-volatile memory 206 on behalf of the host device as described with reference to FIG. 1. For example, the interface controller 202 may operate the volatile memory 204 as a cache for the non-volatile memory 206. Operating the volatile memory 204 as the cache may allow subsystem to provide the benefits of the non-volatile memory 206 (e.g., non-volatile, high-density storage) while maintaining compatibility with a host device that supports a different protocol than the non-volatile memory 206.

In FIG. 2, dashed lines between components represent the flow of data or communication paths for data and solid lines between components represent the flow of commands or communication paths for commands. In some cases, the memory subsystem 200 is one of multiple similar or identical subsystems that may be included in an electronic device. Each subsystem may be referred to as a slice and may be associated with a respective channel of a host device in some examples.

The non-volatile memory 206 may be configured to operate as a main memory (e.g., memory for long-term data storage) for a host device. In some cases, the non-volatile memory 206 may include one or more arrays of FeRAM cells. Each FeRAM cell may include a selection component and a ferroelectric capacitor and may be accessed by applying appropriate voltages to one or more access lines such as word lines, plates lines, and digit lines. In some examples, a subset of FeRAM cells coupled with to an activated word line may be sensed, for example concurrently or simultaneously, without having to sense all FeRAM cells coupled with the activated word line. Accordingly, a page size for an FeRAM array may be different than (e.g., smaller than) a DRAM page size. In the context of a memory device, a page may refer to the memory cells in a row (e.g., a group of the memory cells that have a common row address) and a page size may refer to the number of memory cells or column addresses in a row, or the number of column addresses accessed during an access operation. Alternatively, a page size may refer to a size of data handled by various interfaces or the amount of data a row is capable of storing. In some cases, different memory device types may have different page sizes. For example, a DRAM page size (e.g., 2 kB) may be a superset of a non-volatile memory (e.g., FeRAM) page size (e.g., 64B).

A smaller page size of an FeRAM array may provide various efficiency benefits, as an individual FeRAM cell may require more power to read or write than an individual DRAM cell. For example, a smaller page size for an FeRAM array may facilitate effective energy usage because a smaller number of FeRAM cells may be activated when an associated change in information is minor. In some examples, the page size for an array of FeRAM cells may vary, for example dynamically (e.g., during operation of the array of FeRAM cells) depending on the nature of data and command utilizing FeRAM operation.

Although an individual FeRAM cell may require more power to read or write than an individual DRAM cell, an FeRAM cell may maintain its stored logic state for an extended period of time in the absence of an external power source, as the ferroelectric material in the FeRAM cell may maintain a non-zero electric polarization in the absence of an electric field. Therefore, including an FeRAM array in the non-volatile memory 206 may provide power and efficiency benefits relative to volatile memory cells (e.g., DRAM cells in the volatile memory 204), as it may reduce or eliminate requirements to perform refresh operations.

The volatile memory 204 may be configured to operate as a cache for the non-volatile memory 206. In some cases, the volatile memory 204 may include one or more arrays of DRAM cells. Each DRAM cell may include a capacitor that includes a dielectric material to store a charge representative of the programmable state. The memory cells of the volatile memory 204 may be logically grouped or arranged into one or more memory banks (as referred to herein as "banks"). For example, volatile memory 204 may include sixteen banks. The memory cells of a bank may be arranged in a grid or an array of intersecting columns and rows and each memory cell may be accessed or refreshed by applying appropriate voltages to the digit line (e.g., column line) and word line (e.g., row line) for that memory cell. The rows of a bank may be referred to pages, and the page size may refer to the number of columns or memory cells in a row (and thus, the amount of data a row is capable of storing). As noted, the page size of the volatile memory 204 may be different than (e.g., larger than) the page size of the non-volatile memory 206.

The interface controller 202 may include various circuits for interfacing (e.g., communicating) with other devices, such as a host device, the volatile memory 204, and the non-volatile memory 206. For example, the interface controller 202 may include a data (DA) bus interface 208, a command and address (C/A) bus interface 210, a data bus interface 212, a C/A bus interface 214, a data bus interface 216, and a C/A bus interface 264. The data bus interfaces may support the communication of information using one or more communication protocols. For example, the data bus interface 208, the C/A bus interface 210, the data bus interface 216, and the C/A bus interface 264 may support information that is communicated using a first protocol (e.g., LPDDR signaling), whereas the data bus interface 212 and the C/A bus interface 214 may support information communicated using a second protocol. Thus, the various bus interfaces coupled with the interface controller 202 may support different amounts of data or data rates.

The data bus interface 208 may be coupled with the data bus 260, the transactional bus 222, and the buffer circuitry 224. The data bus interface 208 may be configured to transmit and receive data over the data bus 260 and control information (e.g., acknowledgements/negative acknowledgements) or metadata over the transactional bus 222. The data bus interface 208 may also be configured to transfer data between the data bus 260 and the buffer circuitry 224. The data bus 260 and the transactional bus 222 may be coupled with the interface controller 202 and the host device such that a conductive path is established between the interface controller 202 and the host device. In some examples, the pins of the transactional bus 222 may be referred to as data mask inversion (DMI) pins. Although shown with one data bus 260 and one transactional bus 222, there may be any number of data buses 260 and any number of transactional buses 222 coupled with one or more data bus interfaces 208.

The C/A bus interface 210 may be coupled with the C/A bus 226 and the decoder 228. The C/A bus interface 210 may be configured to transmit and receive commands and addresses over the C/A bus 226. The commands and addresses received over the C/A bus 226 may be associated with data received or transmitted over the data bus 260. The C/A bus interface 210 may also be configured to transmit commands and addresses to the decoder 228 so that the decoder 228 can decode the commands and relay the decoded commands and associated addresses to the command circuitry 230.

The data bus interface 212 may be coupled with the data bus 232 and the memory interface circuitry 234. The data bus interface 212 may be configured to transmit and receive data over the data bus 232, which may be coupled with the non-volatile memory 206. The data bus interface 212 may also be configured to transfer data between the data bus 232 and the memory interface circuitry 234. The C/A bus interface 214 may be coupled with the C/A bus 236 and the memory interface circuitry 234. The C/A bus interface 214 may be configured to receive commands and addresses from the memory interface circuitry 234 and relay the commands and the addresses to the non-volatile memory 206 (e.g., to a local controller of the non-volatile memory 206) over the C/A bus 236. The commands and the addresses transmitted over the C/A bus 236 may be associated with data received or transmitted over the data bus 232. The data bus 232 and the C/A bus 236 may be coupled with the interface controller 202 and the non-volatile memory 206 such that conductive paths are established between the interface controller 202 and the non-volatile memory 206.

The data bus interface 216 may be coupled with the data buses 238 and the memory interface circuitry 240. The data bus interface 216 may be configured to transmit and receive data over the data buses 238, which may be coupled with the volatile memory 204. The data bus interface 216 may also be configured to transfer data between the data buses 238 and the memory interface circuitry 240. The C/A bus interface 264 may be coupled with the C/A bus 242 and the memory interface circuitry 240. The C/A bus interface 264 may be configured to receive commands and addresses from the memory interface circuitry 240 and relay the commands and the addresses to the volatile memory 204 (e.g., to a local controller of the volatile memory 204) over the C/A bus 242. The commands and addresses transmitted over the C/A bus 242 may be associated with data received or transmitted over the data buses 238. The data bus 238 and the C/A bus 242 may be coupled with the interface controller 202 and the volatile memory 204 such that conductive paths are established between the interface controller 202 and the volatile memory 204.

In addition to buses and bus interfaces for communicating with coupled devices, the interface controller 202 may include circuitry for operating the non-volatile memory 206 as a main memory and the volatile memory 204 as a cache. For example, the interface controller 202 may include command circuitry 230, buffer circuitry 224, cache management circuitry 244, one or more engines 246, and one or more schedulers 248.

The command circuitry 230 may be coupled with the buffer circuitry 224, the decoder 228, the cache management circuitry 244, and the schedulers 248, among other components. The command circuitry 230 may be configured to receive command and address information from the decoder 228 and store the command and address information in the queue 250. The command circuitry 230 may include logic 262 that processes command information (e.g., from a host device) and storage information from other components (e.g., the cache management circuitry 244, the buffer circuitry 224) and uses that information to generate one or more commands for the schedulers 248. The command circuitry 230 may also be configured to transfer address information (e.g., address bits) to the cache management circuitry 244. In some examples, the logic 26 2522 may be a circuit configured to operate as a finite state machine (FSM).

The buffer circuitry 224 may be coupled with the data bus interface 208, the command circuitry 230, the memory interface circuitry 234, and the memory interface circuitry 234. The buffer circuitry 224 may include a set of one or more buffer circuits for at least some banks, if not each bank, of the volatile memory 204. The buffer circuitry 224 may also include components (e.g., a memory controller) for accessing the buffer circuits. In one example, the volatile memory 204 may include sixteen banks and the buffer circuitry 224 may include sixteen sets of buffer circuits. Each set of the buffer circuits may be configured to store data from or for (or both) a respective bank of the volatile memory 204. As an example, the buffer circuit set for bank 0 (BK0) may be configured to store data from or for (or both) the first bank of the volatile memory 204 and the buffer circuit for bank 15 (BK15) may be configured to store data from or for (or both) the sixteenth bank of the volatile memory 204.

Each set of buffer circuits in the buffer circuitry 224 may include a pair of buffers. The pair of buffers may include one buffer (e.g., an open page data (OPD) buffer) configured to store data targeted by an access command (e.g., a write command or read command) from the host device and another buffer (e.g., a victim page data (VPD) buffer) configured to store data for an eviction process that results from the access command. For example, the buffer circuit set for BK0 may include the buffer 218 and the buffer 220, which may be examples of buffer 135-a and 135-b, respectively. The buffer 218 may be configured to store BK0 data that is targeted by an access command from the host device. And the buffer 220 may be configured to store data that is transferred from BK0 as part of an eviction process triggered by the access command. Each buffer in a buffer circuit set may be configured with a size (e.g., storage capacity) that corresponds to a page size of the volatile memory 204. For example, if the page size of the volatile memory 204 is 2 kB, the size of each buffer may be 2 kB. Thus, the size of the buffer may be equivalent to the page size of the volatile memory 204 in some examples.

The cache management circuitry 244 may be coupled with the command circuitry 230, the engines 246, and the schedulers 248, among other components. The cache management circuitry 244 may include a cache management circuit set for one or more banks (e.g., each bank) of volatile memory. As an example, the cache management circuitry 244 may include sixteen cache management circuit sets for BK0 through BK15. Each cache management circuit set may include two memory arrays that may be configured to store storage information for the volatile memory 204. As an example, the cache management circuit set for BK0 may include a memory array 252 (e.g., a Cache DRAM Tag Array (CDT-TA)) and a memory array 254 (e.g., a CDRAM Valid (CDT-V) array), which may be configured to store storage information for BK0. The memory arrays may also be referred to as arrays or buffers in some examples. In some cases, the memory arrays may be or include volatile memory cells, such as static RAM (SRAM) cells.

Storage information (or "metadata") may include content information, validity information, or dirty information (or any combination thereof) associated with the volatile memory 204, among other examples. Content information (which may also be referred to as tag information or address information) may indicate which data is stored in a set of volatile memory cells. For example, the content information (e.g., a tag address) for a row of the volatile memory 204 may indicate which set of one or more non-volatile memory cells currently has data stored in the row. As noted, validity information may indicate whether the data stored in a set of volatile memory cells is actual data (e.g., data having an intended order or form) or placeholder data (e.g., data being random or dummy, not having an intended or important order). And dirty information may indicate whether the data stored in a set of one or more volatile memory cells of the volatile memory 204 is different than corresponding data stored in a set of one or more non-volatile memory cells of the non-volatile memory 206. For example, dirty information may indicate whether data stored in a set of volatile memory cells has been updated relative to data stored in the non-volatile memory 206.

The memory array 252 may include memory cells that store storage information (e.g., tag information, validity information, dirty information) for an associated bank (e.g., BK0) of the volatile memory 204. The storage information may be stored on a per-row basis (e.g., there may be respective storage information for each row of the associated non-volatile memory bank). The interface controller 202 may check for requested data in the volatile memory 204 by referencing the storage information in the memory array 252. For instance, the interface controller 202 may receive, from a host device, a retrieval command for data in a set of non-volatile memory cells in the non-volatile memory 206. The interface controller 202 may use a set of one or more address bits (e.g., a set of row address bits) targeted by the access request to reference the storage information in the memory array 252. For instance, using set-associative mapping, the interface controller 202 may reference the content information in the memory array 252 to determine which set of volatile memory cells, if any, stores the requested data.

In addition to storing content information for volatile memory cells, the memory array 252 may also store validity information that indicates whether the data in a set of volatile memory cells is actual data (also referred to as valid data) or random data (also referred to as invalid data). For example, the volatile memory cells in the volatile memory 204 may initially store random data and continue to do so until the volatile memory cells are written with data from a host device or the non-volatile memory 206. To track which data is valid, the memory array 252 may be configured to set a bit for each set (e.g., row) of volatile memory cells when actual data is stored in that set of volatile memory cells. This bit may be referred to a validity bit or a validity flag. As with the content information, the validity information stored in the memory array 252 may be stored on a per-row basis. Thus, each validity bit may indicate the validity of data stored in an associated row in some examples.

In some examples, the memory array 252 may store dirty information that indicates whether a set (e.g., row) of volatile memory cells stores any dirty data. Like the validity information, the dirty information stored in the memory array 252 may be stored on a per-row basis.

The memory array 254 may be similar to the memory array 252 and may also include memory cells that store storage information for a bank (e.g., BK0) of the volatile memory 204 that is associated with the memory array 252. For example, the memory array 254 may store validity information and dirty information for a bank of the volatile memory 204. However, the storage information stored in the memory array 254 may be stored on a sub-block basis as opposed to a per-row basis. For example, the validity information stored in the memory cells of the memory array 254 may indicate the validity of data for subsets of volatile memory cells in a row of the volatile memory 204.

As an example, the validity information in the memory array 254 may indicate the validity of each subset (e.g., 32B or 64B) of data stored in row of BK0 of the volatile memory 204. Similarly, the dirty information stored in the memory cells of the memory array 254 may indicate which subsets of volatile memory cells in a row of the volatile memory 204 store dirty data. For instance, the dirty information in the memory array 254 may indicate the dirty status of each subset (e.g., 32B or 64B) of data stored in row of BK0 of the volatile memory 204. Storing storage information (e.g., tag information, validity information) on a per-row basis in the memory array 252 may allow the interface controller 202 to determine whether there is a hit or miss for data in the volatile memory 204. Storing storage information (e.g., validity information, dirty information) on a sub-block basis in the memory array 254 may allow the interface controller 202 to determine which subsets of data to return to the host device (e.g., during a retrieval process) and which subsets of data to preserve in the non-volatile memory 206 (e.g., during an eviction process).

Each cache management circuit set may also include a respective pair of registers coupled with the command circuitry 230, the engines 246, the memory interface circuitry 234, the memory interface circuitry 240, and the memory arrays for that cache management circuit set, among other components. For example, a cache management circuit set may include a first register (e.g., a register 256 which may be an open page tag (OPT) register) configured to receive storage information (e.g., one or more bits of tag information, validity information, or dirty information, other information, or any combination) from the memory array 252 or the scheduler 248-b or both. The cache management circuitry set may also include a second register (e.g., a register 258 which may be a victim page tag (VPT) register) configured to receive storage information (e.g., validity information or dirty information or both) from the memory array 254 and the scheduler 248-a or both. The information in the register 256 and the register 258 may be transferred to the command circuitry 230 and the engines 246 to enable decision-making by these components. For example, the command circuitry 230 may issue commands for reading the non-volatile memory 206 or the volatile memory 204 based on storage information in the register 256 or the register 258 or both.

The engine 246-a may be coupled with the register 256, the register 258, and the schedulers 248. The engine 246-a may be configured to receive storage information from various components and issue commands to the schedulers 248 based on the storage information. For example, when the interface controller 202 is in a first mode such as a write-through mode, the engine 246-a may issue commands to the scheduler 248-b and in response the scheduler 248-b to initiate or facilitate the transfer of data from the buffer 218 to both the volatile memory 204 and the non-volatile memory 206. Alternatively, when the interface controller 202 is in a second mode such as a write-back mode, the engine 246-a may issue commands to the scheduler 248-b and in response the scheduler 248-b may initiate or facilitate the transfer of data from the buffer 218 to the volatile memory 204. In the event of a write-back operation, the data stored in the volatile memory 204 may eventually be transferred to the non-volatile memory 206 during a subsequent eviction process.

The engine 246-b may be coupled with the register 258 and the scheduler 248-a. The engine 246-b may be configured to receive storage information from the register 258 and issue commands to the scheduler 248-a based on the storage information. For instance, the engine 246-b may issue commands to the scheduler 248-a to initiate or facilitate transfer of dirty data from the buffer 220 to the non-volatile memory 206 (e.g., as part of an eviction process). If the buffer 220 holds a set of data transferred from the volatile memory 204 (e.g., victim data), the engine 246-b may indicate which one or more subsets (e.g., which 64B) of the set of data in the buffer 220 should be transferred to the non-volatile memory 206.

The scheduler 248-a may be coupled with various components of the interface controller 202 and may facilitate accessing the non-volatile memory 206 by issuing commands to the memory interface circuitry 234. The commands issued by the scheduler 248-a may be based on commands from the command circuitry 230, the engine 246-a, the engine 246-b, or a combination of these components. Similarly, the scheduler 248-b may be coupled with various components of the interface controller 202 and may facilitate accessing the volatile memory 204 by issuing commands to the memory interface circuitry 240. The commands issued by the scheduler 248-b may be based on commands from the command circuitry 230 or the engine 246-a, or both.

The memory interface circuitry 234 may communicate with the non-volatile memory 206 via one or more of the data bus interface 212 and the C/A bus interface 214. For example, the memory interface circuitry 234 may prompt the C/A bus interface 214 to relay commands issued by the memory interface circuitry 234 over the C/A bus 236 to a local controller in the non-volatile memory 206. And the memory interface circuitry 234 may transmit to, or receive data from, the non-volatile memory 206 over the data bus 232. In some examples, the commands issued by the memory interface circuitry 234 may be supported by the non-volatile memory 206 but not the volatile memory 204 (e.g., the commands issued by the memory interface circuitry 234 may be different than the commands issued by the memory interface circuitry 240).

The memory interface circuitry 240 may communicate with the volatile memory 204 via one or more of the data bus interface 216 and the C/A bus interface 264. For example, the memory interface circuitry 240 may prompt the C/A bus interface 264 to relay commands issued by the memory interface circuitry 240 over the C/A bus 242 to a local controller of the volatile memory 204. And the memory interface circuitry 240 may transmit to, or receive data from, the volatile memory 204 over one or more data buses 238. In some examples, the commands issued by the memory interface circuitry 240 may be supported by the volatile memory 204 but not the non-volatile memory 206 (e.g., the commands issued by the memory interface circuitry 240 may be different than the commands issued by the memory interface circuitry 234).

Together, the components of the interface controller 202 may operate the non-volatile memory 206 as a main memory and the volatile memory 204 as a cache. Such operation may be prompted by one or more access commands (e.g., read/retrieval commands/requests and write/storage commands/requests) received from a host device.

In some examples, the interface controller 202 may receive a storage command from the host device. The storage command may be received over the C/A bus 226 and transferred to the command circuitry 230 via one or more of the C/A bus interface 210 and the decoder 228. The storage command may include or be accompanied by address bits that target a memory address of the non-volatile memory 206. The data to be stored may be received over the data bus 260 and transferred to the buffer 218 via the data bus interface 208. In a write-through mode, the interface controller 202 may transfer the data to both the non-volatile memory 206 and the volatile memory 204. In a write-back mode, the interface controller 202 may transfer the data to only the volatile memory 204.

In either mode, the interface controller 202 may first check to see if the volatile memory 204 has memory cells available to store the data. To do so, the command circuitry 230 may reference the memory array 252 (e.g., using a set of the memory address bits) to determine whether one or more of the n sets (e.g., row) of volatile memory cells associated with the memory address are empty (e.g., store random or invalid data). For example, the command circuitry 230 may determine whether one or more of the n sets (e.g., rows) of volatile memory cells is available based on tag information and validity information stored in the memory array 252. In some cases, a set of volatile memory cells in the volatile memory 204 may be referred to as a line, cache line, or row.

If one of then associated sets of volatile memory cells is available for storing information, the interface controller 202 may transfer the data from the buffer 218 to the volatile memory 204 for storage in that set of volatile memory cells. But if no associated sets of volatile memory cells are empty, the interface controller 202 may initiate an eviction process to make room for the data in the volatile memory 204. The eviction process may involve transferring the victim data from one of the n associated sets of volatile memory cells to the buffer 220. The dirty information for the victim data may be transferred from the memory array 254 to the register 258 for identification of dirty subsets of the victim data. After the victim data is stored in the buffer 220, the new data can be transferred from the buffer 218 to the volatile memory 204 and the victim data can be transferred from the buffer 220 to the non-volatile memory 206. In some cases, dirty subsets of the old data are transferred to the non-volatile memory 206 and clean subsets (e.g., unmodified subsets) are discarded. The dirty subsets may be identified by the engine 246-*b* based on dirty information transferred from the memory array 254 to the register 258 during the eviction process.

In another example, the interface controller 202 may receive a retrieval command from the host device. The retrieval command may be received over the C/A bus 226 and transferred to the command circuitry 230 via one or more of the C/A bus interface 210 and the decoder 228. The retrieval command may include address bits that target a memory address of the non-volatile memory 206. Before attempting to access the targeted memory address of the non-volatile memory 206, the interface controller 202 may check to see if the volatile memory 204 stores the data. To do so, the command circuitry 230 may reference the memory array 252 (e.g., using a set of the memory address bits) to determine whether one or more of the n sets (e.g., rows) of volatile memory cells associated with the memory address stores the requested data. If the requested data is stored in the volatile memory 204, the interface controller 202 may transfer the requested data to the buffer 218 for transmission to the host device over the data bus 260.

If the requested data is not stored in the volatile memory 204, the interface controller 202 may retrieve the data from the non-volatile memory 206 and transfer the data to the buffer 218 for transmission to the host device over the data bus 260. Additionally, the interface controller 202 may transfer the requested data from the buffer 218 to the volatile memory 204 so that the data can be accessed with a lower latency during a subsequent retrieval operation. Before transferring the requested data, however, the interface controller 202 may first determine whether one or more of the n associated sets of volatile memory cells is available to store the requested data. The interface controller 202 may determine the availability of the n associated sets of volatile memory cells by communicating with the related cache management circuit set. If an associated set of volatile memory cells is available, the interface controller 202 may transfer the data in the buffer 218 to the volatile memory 204 without performing an eviction process. Otherwise, the interface controller 202 may transfer the data from the buffer 218 to the volatile memory 204 after performing an eviction process.

The memory subsystem 200 may be implemented in one or more configurations, including one-chip versions and multi-chip versions. A multi-chip version may include one or more constituents of the memory subsystem 200, including the interface controller 202, the volatile memory 204, and the non-volatile memory 206 (among other constituents or combinations of constituents), on a chip that is separate from a chip that includes one or more other constituents of the memory subsystem 200. For example, in one multi-chip version, respective separate chips may include each of the interface controller 202, the volatile memory 204, and the non-volatile memory 206. In contrast, a one-chip version may include the interface controller 202, the volatile memory 204, and the non-volatile memory 206 on a single chip.

As noted, the memory subsystem 200 may maintain storage information (e.g., validity information, dirty information) for the volatile memory 204 on a per-row basis and on a per-subset basis. With regards to the volatile memory 204, the minimum size of data (or minimum granularity) for which storage information is maintained may correspond to the cache-line size of the volatile memory 204, which may be the smallest individually accessible portion of a row. As an illustration, the volatile memory 204 may have a cache-line size of 64B, which means that 1) each dirty information bit for the volatile memory 204 corresponds to 64B of data and 2) at least 64B of data is implicated per access command. The cache-line size of the volatile memory 204 may also be referred to as the threshold size or granularity of the volatile memory 204. The threshold size of volatile memory 204 may be larger than the threshold size of the non-volatile memory 206.

To keep the overhead (e.g., storage information) for the volatile memory 204 at a manageable level, the cache-line size of the volatile memory 204 may be relatively large (e.g., larger than the minimum size of an access command from the host device). For example, the volatile memory 204 may have a 64B cache-line size whereas the host device may issue access commands for 32B of data, among other sizes. In general, when the size of data to be accessed is smaller than the cache-line size of the volatile memory 204, the access may be referred to as a partial access. For example, continuing the forgoing discussion, a write command for 32B of data may be referred to as a partial write command or partial write when the volatile memory 120 has a threshold size that is greater than 32B, such as a 64B threshold size. Data that does not satisfy the threshold size of the volatile memory 204 may be referred to as undersized data, insufficiently sized data, or other suitable terminology.

Upon receipt of a partial write command that is a miss (e.g., where data associated with the non-volatile memory address is absent from the volatile memory 120), the interface controller 202 may temporarily store the associated data in a buffer 218 before communicating the data to the non-volatile memory 206 for storage. The interface controller 202 may communicate the data to, and store the data in, the non-volatile memory 206 because the data is too small to store in the volatile memory 204. Such a technique may be referred to as a write-through policy because the data is stored in the non-volatile memory 206 without being stored in the volatile memory 204. But use of the write-through policy may increase the quantity of times the non-volatile memory 206 is accessed, which in turn may negatively impact system performance if the non-volatile memory 206 has longer access times, consumes more power during access operations than the volatile memory 204, or both.

According to the techniques described herein, the interface controller 202 may improve system performance by using, for example, the buffer 218 or another component to combine a first data set associated with a partial write command with a second data set so that the resulting data packet satisfies the cache-line size of the volatile memory 204. The second data set may be data associated with another partial write command or data retrieved from the non-volatile memory 206. The first and second data sets may be associated with adjacent addresses for the volatile memory 204 (e.g., to comply with access restrictions of the volatile memory and so that the validity information and dirty information for volatile memory 204 is accurate for all the data in the packet). Thus, the interface controller 202 may store data associated with a partial write command in the volatile memory 204, as opposed to storing the data in the non-volatile memory 206. Such a technique may be referred to herein as a write-back policy because the data is initially stored in the volatile memory 204 and may not be stored in the non-volatile memory 206 until a subsequent eviction process is performed.

Thus, the interface controller 202 may support multiple policies (e.g., modes) for write commands. Accordingly, it should be appreciated that the interface controller 202 may dynamically switch between policies (e.g., modes) based on various factors and conditions. For example, the interface controller 202 may use the write-back policy for partial write commands that can be combined with other data and for complete write commands (e.g., write commands that satisfy the threshold size of the volatile memory 204) and may use the write-through policy for partial write commands that cannot be combined with other data.

Figure 3:
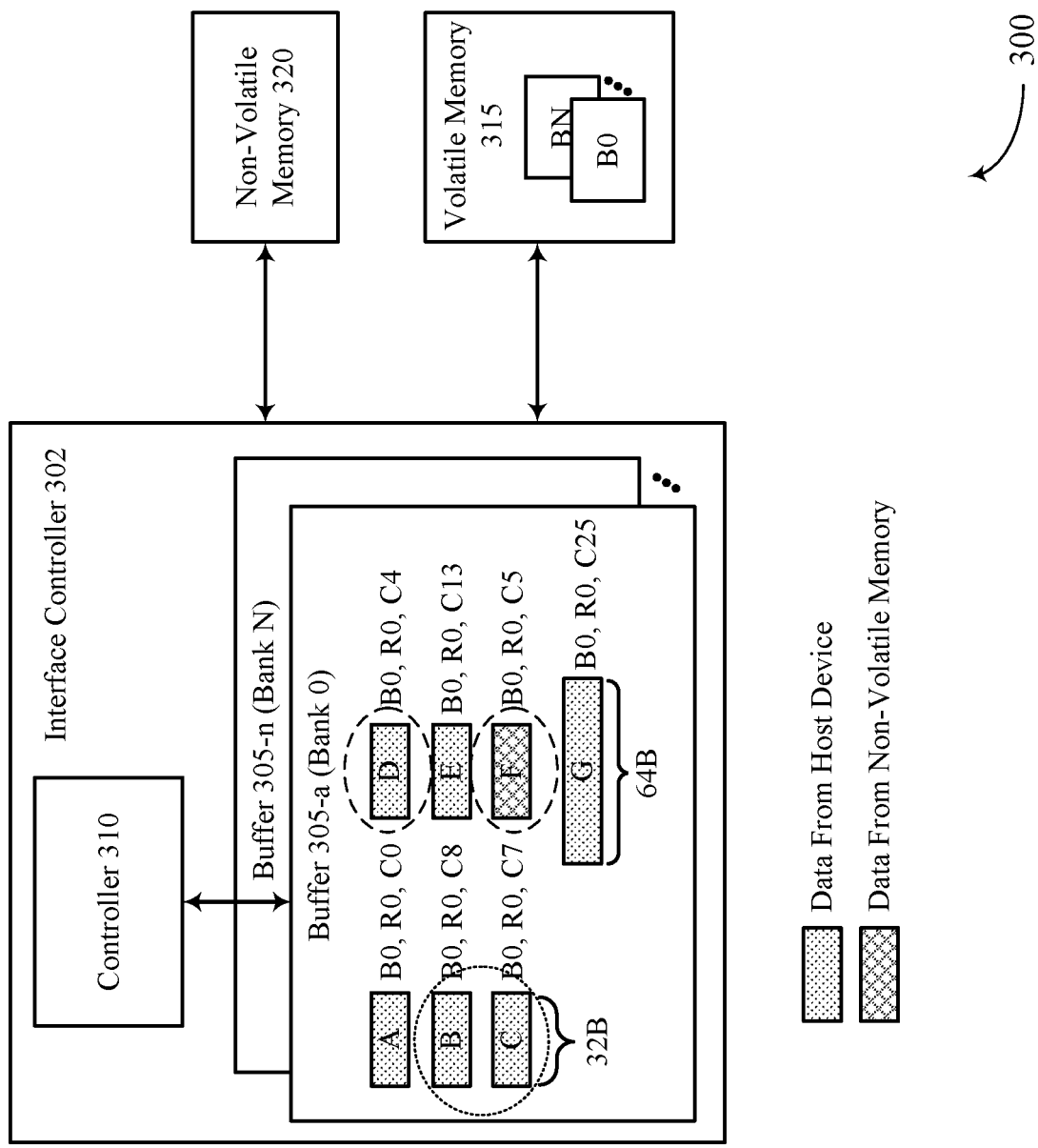
FIG. 3 illustrates an example of a device that supports improved techniques for partial writes in accordance with examples as disclosed herein.

FIG. 3 illustrates an example of a device 300 that supports improved techniques for partial writes in accordance with examples as disclosed herein. The device 300 may be an example of the memory subsystem 110 as described with reference to FIG. 1 or the memory subsystem 200 as described with reference to FIG. 2. The device may include an interface controller 302, a volatile memory 315, and a non-volatile memory 320, which may be coupled with one another via one or more transmission lines or buses or both. The interface controller 302 may include buffers 305, may examples of the buffer 135-a as described with reference to FIG. 1 or the buffers 218 as described with reference to FIG. 2. As described herein, device 300 may strategically combine data in the buffers 305 so that the device can use a write-back policy for partial write commands.

The operations of device 300 are described with reference to examples in which the threshold size associated with the volatile memory 315 is 64B. However, other threshold sizes, such as 32B, 128B, 256B, are also contemplated.

The controller 310 may control local operations of the buffers 305, including access operations such as read operations and write operations. The controller 310 may control the buffers 305 based on access commands received from a host device, among other commands from other components. As an example, the controller 310 may receive write commands from the host device and store associated data provided by the host device in the buffers 305. As another example, the controller 310 may receive data from the non-volatile memory 320 and store the data from the non-volatile memory 320 in the buffers 305. The controller 310 may also control communication of data to and from the buffers 305.

The buffers 305 may serve as intermediary storage devices that store data being routed between the host device, the volatile memory 315, and the non-volatile memory 320. There may be one buffer 305 per bank of the volatile memory 315, which may include banks B0 through BN, and in some examples each buffer 305 may be associated with a corresponding bank of the volatile memory 315. The buffer 305 associated with a bank may, in some examples, be exclusive to that bank meaning that the buffer 305 is used to transfer data to and from that particular bank (and no other bank of the volatile memory 315). For example, buffer 305-a, which is associated with bank B0, may be used to store data for communication to and from bank B0. Alternatively, the buffer 305 associated with a bank may, in some examples, be non-exclusive to a given bank meaning that the buffer 305 is used to transfer data to and from multiple banks. The data stored in a buffer 305 may include data provided by the host device (e.g., write data) or data provided by the non-volatile memory 320 or both. For example, data provided by the host device for bank B0 may be accumulated in buffer 305-a, and data provided by the non-volatile memory 320 for bank B0 may be pulled into buffer 305-a as part of the write-back policy described herein. In some examples, the data accumulated in a buffer 305 may be associated with a same row of the bank to which the buffer 305 is dedicated.

In the illustrated example, buffer 305-a may temporarily store data A through data G. The sizes of the data stored in buffer 305-a may vary or may be a same size. For example, data A through data F may be 32B each and data G may be 64B. Additionally, the origin of the data stored in buffer 305-a may vary. For example, data A through data E and data G may be data provided by the host device (e.g., write data) and data F may be data provided by the non-volatile memory 320 (or vice versa), among other examples. The controller 310 may store data for the volatile memory 315 regardless of the size of the data and may keep track of the addresses associated with each data. For example, the interface controller 302 may determine that data A is associated with an address (B0, R0, C0) of the volatile memory 204, where B0 is the bank address, R0 is the row address, and C0 is the starting column address. And so on and so forth as illustrated.

Upon receipt of a complete write command (e.g., a write command for 64B), the interface controller 302 may implement the write-back policy by communicating the write command and the associated data to the volatile memory 315, when convenient, because the data satisfies the threshold size of the volatile memory 315. For example, after storing data G, the interface controller 302 may communicate data G (and a write command for data G) to the volatile memory 315 because data G is 64B, which is the threshold size of the volatile memory 315. It should be appreciated that the write command for data G may indicate the volatile memory address associated with data G (e.g., B0, R0, C25) so that the volatile memory 315 can write data G to the correct memory cells.

Upon receipt of a partial write command for undersized data (e.g., 32B) that is a miss, the interface controller 302 may seek to implement the write-back policy and fall back to the write-through policy if implementation of the write-back policy is not possible. To implement the write-back policy for the undersized data, the interface controller 302 may either combine the undersize data with existing data in the buffer from another partial write command, wait for data from another partial write command that can be combined with the undersized data, or retrieve appropriate data from the non-volatile memory 320 for combination with the undersized data.

Thus, the interface controller 302 may use the buffers 305 to accumulate data for combination as part of a write-back procedure for undersized data. It should be appreciated that two data sets may be combined if they are associated with adjacent addresses. Addresses are adjacent if the memory cells associated with one of the addresses are contiguous with the memory cells of the other address. For example, a first address and a second address may be adjacent if the memory cells associated with the first addresses are contiguous with the memory cells associated with the second address. In some examples, addresses may be adjacent if they have the same bank address, row address, and consecutive column addresses.

To illustrate a write-back operation for undersized data, consider data B, which is associated with a partial write command. Because data B is associated with an address (e.g., B0, R0, C8) that is adjacent to the address associated with data C (e.g., B0, R0, C7), the interface controller 302 may combine data B and data C into a larger data packet that satisfies the threshold size of the volatile memory 315. Thus, data B may be communicated to, and stored in, volatile memory 315 even though the size of data B is insufficient for accessing the volatile memory 315. The packet comprising data B and data C may be communicated to the volatile memory 315 in response to a pre-charge command for the associated with data B and data C (e.g., row 0) or opportunistically before the pre-charge command is received. A pre-charge command may be a command to de-activate (or "close") a row.

As a second example of a write-back for undersized data, consider data D, which is also associated with a partial write command. If no data in buffer 305-a can be combined with data D (e.g., due to non-adjacent addresses), the interface controller 302 may retrieve from the non-volatile memory 320 data that can be combined with data D. For example, the interface controller 302 may retrieve data F from the non-volatile memory 320 because data F has an address (e.g., B0, R0, C4) that is adjacent to the address associated with data D (B0, R0, C5). Thus, the interface controller 302 may combine data D and data F and communicate the resulting packet, which satisfies the threshold size, to the volatile memory 315 for storage. Retrieval of data F from the non-volatile memory 320 may be possible because the threshold size of the non-volatile memory 320 may be smaller than the threshold size of the volatile memory 315 (e.g., the threshold size of the non-volatile memory 320 may be 32B or even smaller). In some examples, the interface controller 302 may wait until a pre-charge command for the open row is received before retrieving data from the non-volatile memory 320, in the hopes of receiving data that can be combined with data D.

Upon receipt of a partial write command for 32B that is a hit, the interface controller 302 may implement the write-back policy without combination. For example, the interface controller 302 may communicate the data and an associated write command to the volatile memory 315 so that the volatile memory 315 can store the data using a masked write (MWR) operation. In a masked write operation, an entire cache-line is accessed (e.g., 64B worth of data). However, only a portion of the cache-line is written with new data, while the remaining portion of the cache-line is re-written with existing data. Such a writing technique may be permitted because it does not disrupt the accuracy of the validity information for the data. As an example of the write-back policy in a hit scenario, data A may be communicated to the volatile memory 315 for a masked write if a 64B chunk of memory in the volatile memory 315 already has an old version of data A (plus another 32B of data that is to be maintained as-is). After the masked write, the 64B chunk of memory may store the updated version of data A plus the other 32B of data as it existed before the masked write.

Although the masked write technique can be used to implement the write-back policy for partial write hits, it should be appreciated that use of the masked write technique for partial write misses may not be possible in some examples because doing so may affect (e.g., destroy, adversely impact) the accuracy of storage information, such as validity information. When used in the miss context, a masked write updates a subset (e.g., 32B) of a set of data (64B) that is originally entirely invalid. This means that after the masked write, the resulting set of data is half valid and half invalid. Because validity information is stored on a 64B basis (in the given example), the validity information for the set of data will be inaccurate for half (e.g., 32B) of the set of data. So, the combination techniques described herein may allow the interface controller 302 to use a write-back policy for partial write misses without disrupting the accuracy of validity information.

As noted, in some examples, combining undersized data in a buffer 305 may not be possible due to address inconsistencies. For example, interface controller 302 may not be able to combine data E with other data because no data available to the interface controller 302 is associated with an address adjacent to (B0, R0, C13). If data E is still unpaired by the time a pre-charge command for row 0 is received, the interface controller 302 may implement the write-through policy for data E by communicating data E to the non-volatile memory 320 for storage.

Although described with reference to combining two data sets for form a sufficiently sized packet, the techniques described herein may be implemented by combining any quantity of data sets, providing that the resulting packet size is equal to, or an integer multiple of, the threshold size of the volatile memory 315.

Figure 4:
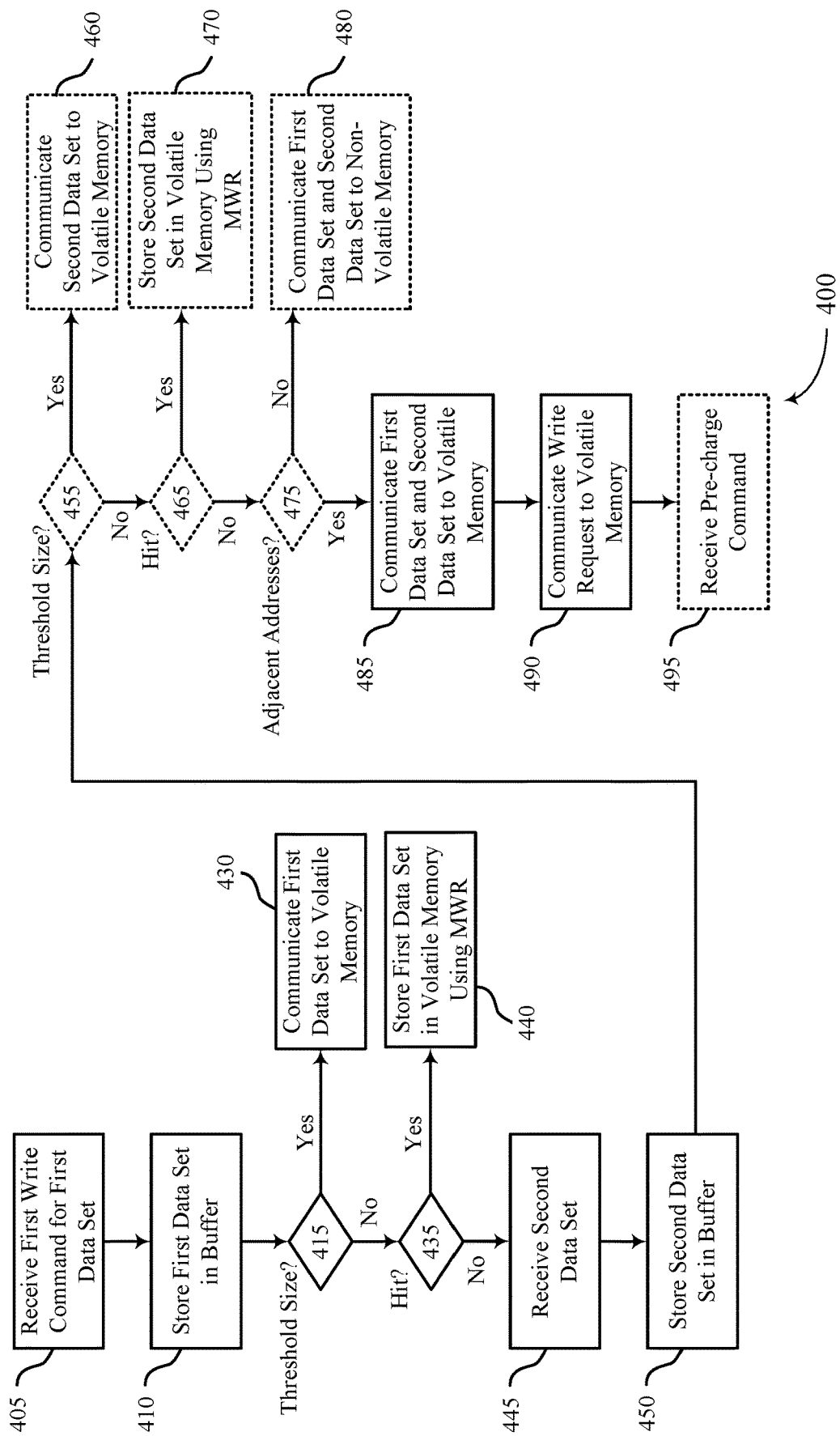
FIG. 4 illustrates an example of a process flow that supports improved techniques for partial writes in accordance with examples as disclosed herein.

FIG. 4 illustrates an example of a process flow 400 that supports improved techniques for partial writes in accordance with examples as disclosed herein. Process flow 400 may be implemented by a memory subsystem 110 or interface controller 115 as described with reference to FIG. 1, a memory subsystem 200 or interface controller 202 as described with reference to FIG. 2, or a device 300 or interface controller 302 as described with reference to FIG. 3. However, other types of devices may implement process flow 400. The process flow 400 may illustrate the operations of a device that strategically combines undersized data to implement a write-back policy for partial write commands.

For ease of reference, the process flow 400 is described with reference to a device. For example, aspects of the process flow 400 may be implemented by a device that includes a buffer coupled with a volatile memory that is configured to operate as a cache for a non-volatile memory. Additionally or alternatively, aspects of the process flow 400 may be implemented as instructions stored in memory (e.g., firmware stored in the volatile memory 120 or the non-volatile memory 125 or both). For example, the instructions, when executed by a controller, may cause the controller to perform the operations of the process flow 400.

At 405, a first write command for a first data set may be received. For example, the device may receive (e.g., from a host device) a partial write command for a first data set that is smaller than the threshold size of a volatile memory of the device. The first set of data may be for a row (e.g., row x) of a bank (e.g., bank y) in the volatile memory. The partial write command and first data set may be received from a host device coupled with the device. The first write command and the first data set may be associated with a first address of the volatile memory. In some examples, the first address may indicate a bank, a row, and a column.

At 410, the first data set may be stored in a buffer. For example, the device may store the first data set in a buffer associated with the bank (e.g., bank y) based at least in part on the first write command.

At 415, it may be determined whether the first data set satisfies the threshold size of the volatile memory. The first data set may satisfy the threshold size if the first data set has a size equal to or greater than the threshold size. If, at 425, it is determined that the first data set satisfies the threshold size, the first data set may, at 430, be communicated to the volatile memory for storage. Thus, the write-back policy may be implemented for a complete write command. If, at 425, it is determined that the first data set does not satisfy the threshold size, the process may proceed to 435.

At 435, it may be determined whether the first write command is a hit or a miss. If, at 435, the first write command is determined to be a hit, the first data set may, at 440, be communicated to the volatile memory for storage using an operation, such as a masked write operation. Thus, a write-back policy may be used for a partial write command that is a hit (e.g., when the volatile memory 315 stores data associated with the non-volatile memory address targeted by the partial write command). If, at 435, the first write command is determined to be a miss (e.g., when data associated with the non-volatile memory address targeted by the partial write command is absent from the volatile memory 315), the process may proceed to 445.

At 445, a second data set may be received. The second data set may be associated with a second address of the volatile memory and may be associated with the same row (e.g., row x) and same bank (e.g., bank y) as the first data set. The second data set may be received from the host device or from the non-volatile memory (e.g., in response to a request from the device). If the second data set is received from the host device, the device may also receive a second write command for the second data set. If the second data set is received from the non-volatile memory, the second data set may be part of a retrieval process initiated by the device. At 450, the second data set may be stored in (e.g., written to) the buffer.

At 455, it may be determined whether the second data set satisfies the threshold size of the volatile memory. The operations of 455 may be performed when the second data set is received from the host device. If, at 455, it is determined that the second data set satisfies the threshold size, the second data set may, at 460, be communicated to the volatile memory for storage. Thus, the write-back policy may be implemented for a complete write command. If, at 455, it is determined that the second data set does not satisfy the threshold size, the process may proceed to 465.

At 465, it may be determined whether the second write command is a hit or a miss. The operations of 465 may be performed when the second data set is received from the host device. If, at 465, the second write command is determined to be a hit, the second data set may, at 470, be communicated to the volatile memory for storage using a masked write operation. Thus, a write-back policy may be used for a partial write command that is a hit. If, at 465, the second write command is determined to be a miss, the process may proceed to 475.

At 475, it may be determined whether the first data set and the second data set are associated with adjacent (e.g., consecutive, contiguous) addresses for the volatile memory. For example, the device may determine whether the first address and the second address are adjacent. The operations of 475 may be performed when the second data set is received from the host device. If, at 475, it is determined that the first data set and the set data set are not associated with adjacent addresses, the first data set and the second data set may, at 480, be communicated to the non-volatile memory for storage. Thus, a write-through policy may be implemented for multiple partial write commands that are not combinable. If, at 475, it is determined that the first data set and the set data set are associated with adjacent addresses, the process may proceed to 485.

At 485, the first data set and the second data set may be communicated to the volatile memory so that the first data set and the second data set can be stored in the volatile memory. The first data set and the second data set may be communicated as a combined set of data that has a size equal to or greater than the threshold size of the volatile memory. At 490, a write command for the data set may be communicated to the volatile memory. The write command may indicate the first address, the second address, or a combination thereof. The write command and set of data may be communicated within a threshold amount of time of each other. Thus, a write-back policy may be implemented for at least one partial write command (e.g., the first write command).

At 495, a pre-charge command for the row (e.g., row x) may be received. Upon receipt of the pre-charge, the device may communicate any existing, undersized dirty data in the buffer to the non-volatile memory. Thus, a write-through policy may be implemented for partial write commands that were un-served at the time of receipt for pre-charge command, among other examples. If the buffer also has data from un-served complete write commands the pre-charge command is received, the device may communicate this data to the volatile memory. Thus, a write-back policy may be implemented for complete write commands that were un-served at the time of receipt for the pre-charge command, among other examples.

Alternative examples of the foregoing may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

Figure 5:
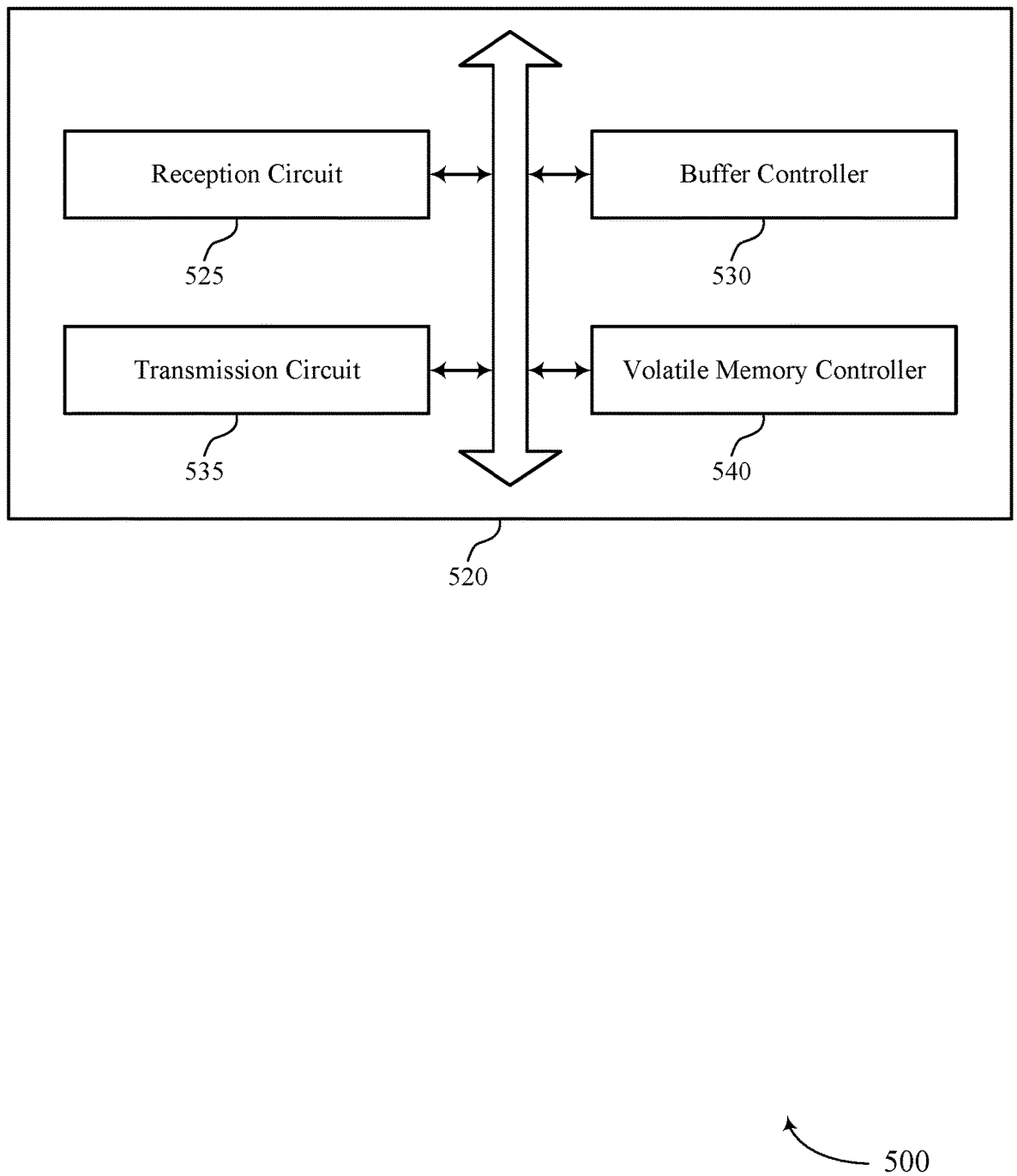
FIG. 5 shows a block diagram of a memory device that supports improved techniques for partial writes in accordance with examples as disclosed herein.

FIG. 5 shows a block diagram 500 of a memory device 520 that supports improved techniques for partial writes in accordance with examples as disclosed herein. The memory device 520 may be an example of aspects of a memory device as described with reference to FIGS. 1 through 4. The memory device 520, or various components thereof, may be an example of means for performing various aspects of improved techniques for partial writes as described herein. For example, the memory device 520 may include a reception circuit 525, a buffer controller 530, a transmission circuit 535, a volatile memory controller 540, or any combination thereof. Each of these components may communicate, directly or indirectly, with one another (e.g., via one or more buses).

The reception circuit 525 may be or include a data bus, a data bus interface, logic, circuitry, a processor, a controller, or other components capable of performing the functions described herein. The buffer controller 530 may be or include logic, circuitry, a processor, a controller, or other components capable of performing the functions described herein. The transmission circuit 535 may be or include a data bus, a data bus interface, logic, circuitry, a processor, a controller, or other components capable of performing the functions described herein. The volatile memory controller 540 may be or include logic, circuitry, a processor, a controller, or other components capable of performing the functions described herein.

In a first example, the reception circuit 525 may be configured as or otherwise support a means for receiving, from a host device, a write command for a first data set provided by the host device. The buffer controller 530 may be configured as or otherwise support a means for storing, based at least in part on the write command, the first data set in a buffer coupled with a volatile memory, the volatile memory configured to operate as a cache for a non-volatile memory. The transmission circuit 535 may be configured as or otherwise support a means for communicating, from the buffer to the volatile memory based at least in part on the write command, a set of data including the first data set and a second data set, the set of data based at least in part on the first data set and the second data set being associated with adjacent addresses for the volatile memory and on the first data set and the second data set each having a smaller size than a threshold size associated with the volatile memory.

In some examples, the threshold size includes a minimum size of data for which metadata of the volatile memory is maintained, a minimum size of data for accessing the volatile memory, or a combination thereof.

In some examples, the write command is associated with a first address for the volatile memory, and the reception circuit 525 may be configured as or otherwise support a means for receiving, from the host device, a second write command for the second data set, the second write command associated with a second address for the volatile memory. In some examples, the write command is associated with a first address for the volatile memory, and the volatile memory controller 540 may be configured as or otherwise support a means for determining whether the first data set and second data set are associated with adjacent memory addresses for the volatile memory based at least in part on the first address and the second address.

In some examples, the buffer controller 530 may be configured as or otherwise support a means for storing the second data set in the buffer based at least in part on the second write command and before the command for the first data set is received.

In some examples, the transmission circuit 535 may be configured as or otherwise support a means for communicating the second data set from the non-volatile memory to the buffer based at least in part on the first data set having a smaller size than the threshold size and on the first data set and the second data set being associated with adjacent addresses. In some examples, the buffer controller 530 may be configured as or otherwise support a means for storing the second data set in the buffer before communicating the set of data from the buffer to the volatile memory.

In some examples, the first data set and the second data set are associated with a row of the volatile memory, and the reception circuit 525 may be configured as or otherwise support a means for receiving, from the host device, a pre-charge command for the row of the volatile memory, where the first data set and the second data set are communicated to the volatile memory before the pre-charge command is received.

In some examples, the volatile memory is configured to operate as a cache for a non-volatile memory coupled with the memory device, and the transmission circuit 535 may be configured as or otherwise support a means for communicating, from the buffer to the non-volatile memory, a third data set associated with the row of the volatile memory based at least in part on the pre-charge command and the third data set having a size smaller than the threshold size.

In some examples, the volatile memory controller 540 may be configured as or otherwise support a means for determining that data corresponding to the first data set is absent from the volatile memory, where the first data set and the second data set are communicated to the volatile memory based at least in part on the determination.

In some examples, the adjacent addresses for the volatile memory include column addresses in a same row of a bank in the volatile memory. In some examples, the set of data has a size that is equal to or an integer multiple of the threshold size.

In a second example, the buffer controller 530 may be configured as or otherwise support a means for storing, based at least in part on a received write command, a first data set in the buffer. The volatile memory controller 540 may be configured as or otherwise support a means for determining whether a size of the first data set is smaller than a threshold size for accessing the volatile memory. The transmission circuit 535 may be configured as or otherwise support a means for communicating, from the buffer to the volatile memory based at least in part on the write command and the size of the first data set being smaller than the threshold size, a set of data including the first data set and a second data set with a size smaller than the threshold size, the set of data having at least the threshold size.

In some examples, the volatile memory controller 540 may be configured as or otherwise support a means for determining that the first data set and the second data set are associated with adjacent addresses for the volatile memory, where the set of data is communicated based at least in part on the determination.

In some examples, the buffer controller 530 may be configured as or otherwise support a means for storing the second data set in the buffer based at least in part on a second received write command, where the second data set is stored in the buffer before the write command for the first data set is received. In some examples, the volatile memory controller 540 may be configured as or otherwise support a means for determining than the size of the second data set is smaller than the threshold size, where the set of data is communicated based at least in part on the size of the second data set being smaller than the threshold size.

In some examples, the transmission circuit 535 may be configured as or otherwise support a means for communicating the second data set from the non-volatile memory to the buffer based at least in part on the first data set having a smaller size than the threshold size and the first data set and the second data set being associated with adjacent addresses for the volatile memory. In some examples, the buffer controller 530 may be configured as or otherwise support a means for storing the second data set in the buffer before communicating the set of data from the buffer to the volatile memory.

In some examples, the volatile memory controller 540 may be configured as or otherwise support a means for determining that data corresponding to the first data set is absent from the volatile memory, where the first data set and the second data set are communicated to the volatile memory based at least in part on the determination. In some examples, the volatile memory controller 540 may be configured as or otherwise support a means for determining that data from a non-volatile memory address associated with the write command is absent from the volatile memory.

Figure 6:
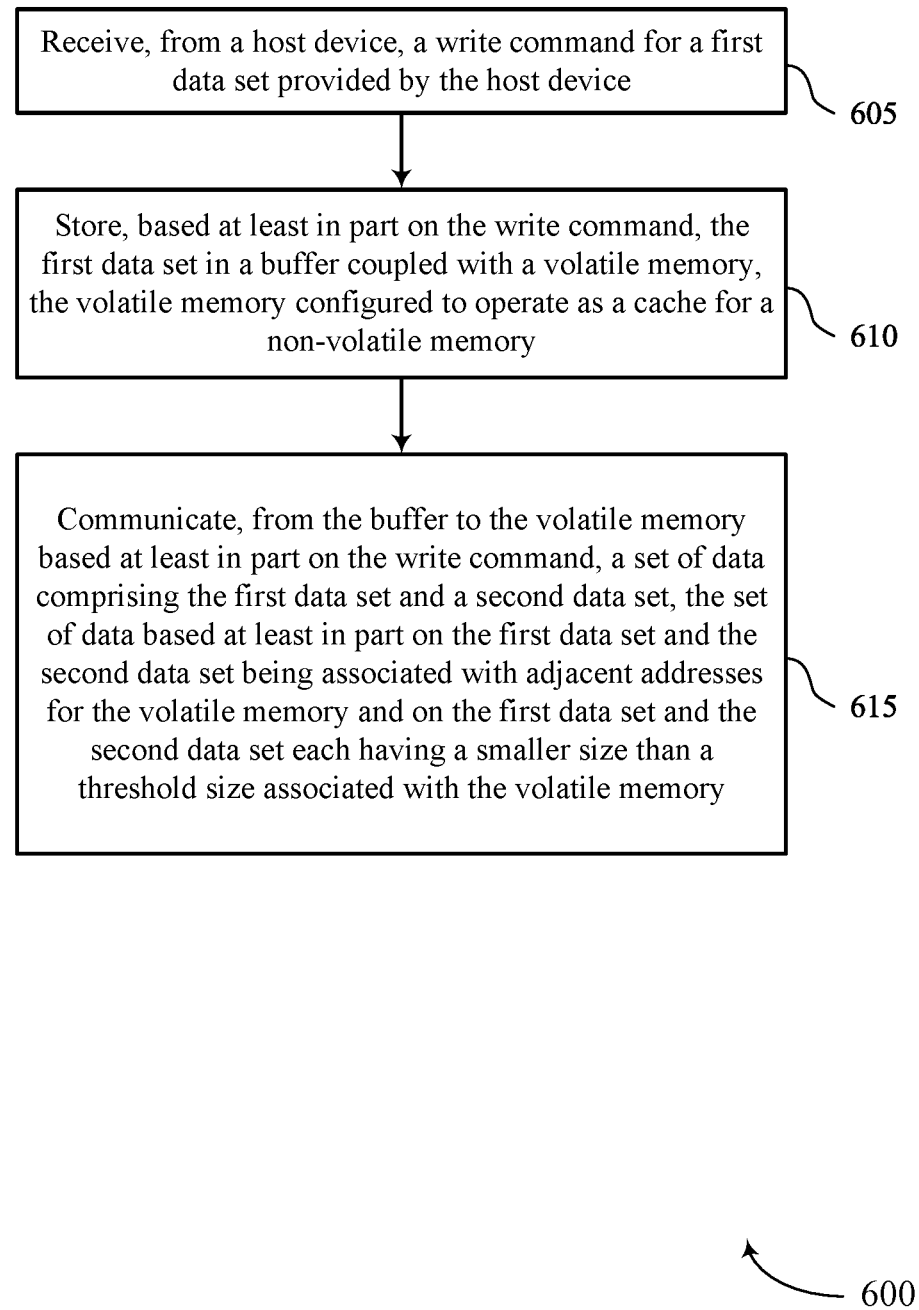
FIGS. 6 and 7 show flowcharts illustrating a method or methods that support improved techniques for partial writes in accordance with examples as disclosed herein.

FIG. 6 shows a flowchart illustrating a method 600 that supports improved techniques for partial writes in accordance with examples as disclosed herein. The operations of method 600 may be implemented by a memory device or its components as described herein. For example, the operations of method 600 may be performed by a memory device as described with reference to FIGS. 1 through 5. In some examples, a memory device may execute a set of instructions to control the functional elements of the device to perform the described functions. Additionally or alternatively, the memory device may perform aspects of the described functions using special-purpose hardware.

At 605, the method may include receiving, from a host device, a write command for a first data set provided by the host device. The operations of 605 may be performed in accordance with examples as disclosed herein. In some examples, aspects of the operations of 605 may be performed by a reception circuit 525 as described with reference to FIG. 5.

At 610, the method may include storing, based at least in part on the write command, the first data set in a buffer coupled with a volatile memory, the volatile memory configured to operate as a cache for a non-volatile memory. The operations of 610 may be performed in accordance with examples as disclosed herein. In some examples, aspects of the operations of 610 may be performed by a buffer controller 530 as described with reference to FIG. 5.

At 615, the method may include communicating, from the buffer to the volatile memory based at least in part on the write command, a set of data including the first data set and a second data set, the set of data based at least in part on the first data set and the second data set being associated with adjacent addresses for the volatile memory and on the first data set and the second data set each having a smaller size than a threshold size associated with the volatile memory. The operations of 615 may be performed in accordance with examples as disclosed herein. In some examples, aspects of the operations of 615 may be performed by a transmission circuit 535 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for receiving, from a host device, a write command for a first data set provided by the host device, storing, based at least in part on the write command, the first data set in a buffer coupled with a volatile memory, the volatile memory configured to operate as a cache for a non-volatile memory, and communicating, from the buffer to the volatile memory based at least in part on the write command, a set of data including the first data set and a second data set, the set of data based at least in part on the first data set and the second data set being associated with adjacent addresses for the volatile memory and on the first data set and the second data set each having a smaller size than a threshold size associated with the volatile memory.

In some examples of the method 600 and the apparatus described herein, the threshold size includes a minimum size of data for which metadata of the volatile memory may be maintained, a minimum size of data for accessing the volatile memory, or a combination thereof.

In some examples of the method 600 and the apparatus described herein, the write command may be associated with a first address for the volatile memory and the method, apparatuses, and non-transitory computer-readable medium may include further operations, features, circuitry, logic, means, or instructions for receiving, from the host device, a second write command for the second data set, the second write command associated with a second address for the volatile memory and determining whether the first data set and second data set may be associated with adjacent memory addresses for the volatile memory based at least in part on the first address and the second address.

Some examples of the method 600 and the apparatus described herein may further include operations, features, circuitry, logic, means, or instructions for storing the second data set in the buffer based at least in part on the second write command and before the command for the first data set may be received.

Some examples of the method 600 and the apparatus described herein may further include operations, features, circuitry, logic, means, or instructions for communicating the second data set from the non-volatile memory to the buffer based at least in part on the first data set having a smaller size than the threshold size and on the first data set and the second data set being associated with adjacent addresses and storing the second data set in the buffer before communicating the set of data from the buffer to the volatile memory.

In some examples of the method 600 and the apparatus described herein, the first data set and the second data set may be associated with a row of the volatile memory and the method, apparatuses, and non-transitory computer-readable medium may include further operations, features, circuitry, logic, means, or instructions for receiving, from the host device, a pre-charge command for the row of the volatile memory, where the first data set and the second data set may be communicated to the volatile memory before the pre-charge command may be received.

In some examples of the method 600 and the apparatus described herein, the volatile memory may be configured to operate as a cache for a non-volatile memory coupled with the memory device and the method, apparatuses, and non-transitory computer-readable medium may include further operations, features, circuitry, logic, means, or instructions for communicating, from the buffer to the non-volatile memory, a third data set associated with the row of the volatile memory based at least in part on the pre-charge command and the third data set having a size smaller than the threshold size.

Some examples of the method 600 and the apparatus described herein may further include operations, features, circuitry, logic, means, or instructions for determining that data corresponding to the first data set may be absent from the volatile memory, where the first data set and the second data set may be communicated to the volatile memory based at least in part on the determination.

In some examples of the method 600 and the apparatus described herein, the adjacent addresses for the volatile memory include column addresses in a same row of a bank in the volatile memory.

In some examples of the method 600 and the apparatus described herein, the set of data may have a size that may be equal to or an integer multiple of the threshold size.

Figure 7:
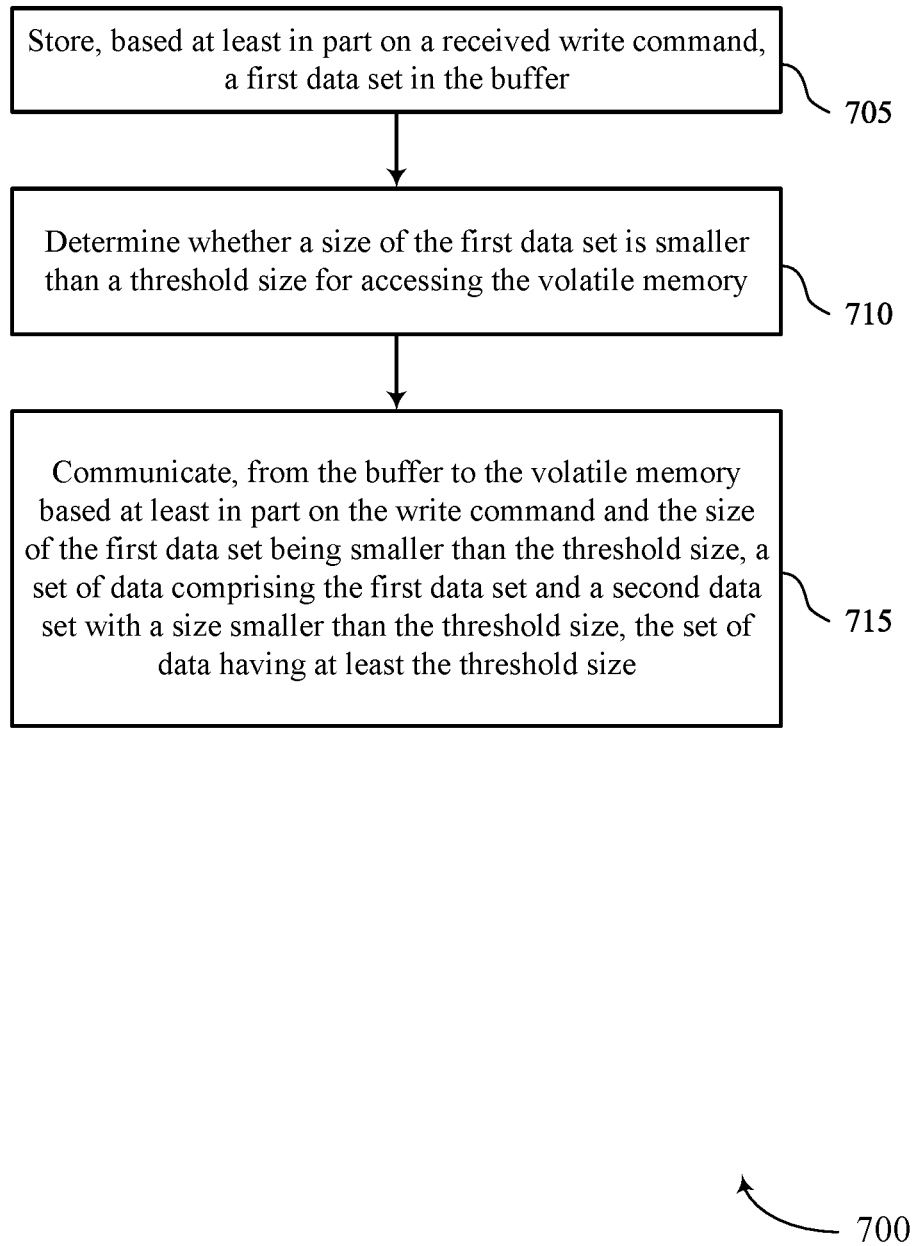

FIG. 7 shows a flowchart illustrating a method 700 that supports improved techniques for partial writes in accordance with examples as disclosed herein. The operations of method 700 may be implemented by a memory device or its components as described herein. For example, the operations of method 700 may be performed by a memory device as described with reference to FIGS. 1 through 5. In some examples, a memory device may execute a set of instructions to control the functional elements of the device to perform the described functions. Additionally or alternatively, the memory device may perform aspects of the described functions using special-purpose hardware.

At 705, the method may include storing, based at least in part on a received write command, a first data set in the buffer. The operations of 705 may be performed in accordance with examples as disclosed herein. In some examples, aspects of the operations of 705 may be performed by a buffer controller 530 as described with reference to FIG. 5.

At 710, the method may include determining whether a size of the first data set is smaller than a threshold size for accessing the volatile memory. The operations of 710 may be performed in accordance with examples as disclosed herein. In some examples, aspects of the operations of 710 may be performed by a volatile memory controller 540 as described with reference to FIG. 5.

At 715, the method may include communicating, from the buffer to the volatile memory based at least in part on the write command and the size of the first data set being smaller than the threshold size, a set of data including the first data set and a second data set with a size smaller than the threshold size, the set of data having at least the threshold size. The operations of 715 may be performed in accordance with examples as disclosed herein. In some examples, aspects of the operations of 715 may be performed by a transmission circuit 535 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for storing, based at least in part on a received write command, a first data set in the buffer, determining whether a size of the first data set is smaller than a threshold size for accessing the volatile memory, and communicating, from the buffer to the volatile memory based at least in part on the write command and the size of the first data set being smaller than the threshold size, a set of data including the first data set and a second data set with a size smaller than the threshold size, the set of data having at least the threshold size.

Some examples of the method 700 and the apparatus described herein may further include operations, features, circuitry, logic, means, or instructions for determining that the first data set and the second data set may be associated with adjacent addresses for the volatile memory, where the set of data may be communicated based at least in part on the determination.

Some examples of the method 700 and the apparatus described herein may further include operations, features, circuitry, logic, means, or instructions for storing the second data set in the buffer based at least in part on a second received write command, where the second data set may be stored in the buffer before the write command for the first data set may be received and determining than the size of the second data set may be smaller than the threshold size, where the set of data may be communicated based at least in part on the size of the second data set being smaller than the threshold size.

Some examples of the method 700 and the apparatus described herein may further include operations, features, circuitry, logic, means, or instructions for communicating the second data set from the non-volatile memory to the buffer based at least in part on the first data set having a smaller size than the threshold size and the first data set and the second data set being associated with adjacent addresses for the volatile memory and storing the second data set in the buffer before communicating the set of data from the buffer to the volatile memory.

Some examples of the method 700 and the apparatus described herein may further include operations, features, circuitry, logic, means, or instructions for determining that data corresponding to the first data set may be absent from the volatile memory, where the first data set and the second data set may be communicated to the volatile memory based at least in part on the determination.

It should be noted that the methods described herein describe possible implementations, and that the operations and the steps may be rearranged or otherwise modified and that other implementations are possible. Further, portions from two or more of the methods may be combined.

An apparatus is described. The apparatus may include a non-volatile memory, a volatile memory configured to operate as a cache for the non-volatile memory, a buffer coupled with the volatile memory, and an interface controller coupled with the non-volatile memory and the volatile memory, the interface controller operable to cause the apparatus to receive, from a host device, a write command for a first data set, store, based at least in part on the write command, the first data set in the buffer, and communicate, from the buffer to the volatile memory based at least in part on the write command, a set of data including the first data set and a second data set, the set of data based at least in part on the first data set and the second data set being associated with adjacent addresses for the volatile memory and on the first data set and the second data set each having a smaller size than a threshold size associated with the volatile memory.

In some examples of the apparatus, the threshold size includes a minimum size of data for which metadata of the volatile memory may be maintained, a minimum size of data for accessing the volatile memory, or a combination thereof.

In some examples of the apparatus, the interface controller may be further operable to cause the apparatus to receive, from the host device, a second write command for the second data set, the second write command associated with a second address for the volatile memory and determine whether the first data set and second data set may be associated with adjacent memory addresses for the volatile memory based at least in part on the first address and the second address.

In some examples of the apparatus, the interface controller may be further operable to cause the apparatus to store the second data set in the buffer based at least in part on the second write command and before the write command for the first data set may be received.

In some examples of the apparatus, the interface controller may be further operable to cause the apparatus to communicate the second data set from the non-volatile memory to the buffer based at least in part on the first data set having a smaller size than the threshold size and the first data set and the second data set being associated with adjacent addresses and store the second data set in the buffer before communicating the set of data from the buffer to the volatile memory.

In some examples of the apparatus, the interface controller may be further operable to cause the apparatus to receive, from the host device, a pre-charge command for the row, where the first data set and the second data set may be communicated to the volatile memory before the pre-charge command may be received.

In some examples of the apparatus, the interface controller may be further operable to cause the apparatus to communicate, from the buffer to the non-volatile memory, a third data set associated with the row of the volatile memory based at least in part on the pre-charge command and the third data set having a size smaller than the threshold size.

In some examples of the apparatus, the interface controller may be further operable to cause the apparatus to determine that data corresponding to the first data set may be absent from the volatile memory, where the first data set and the second data set may be communicated to the volatile memory based at least in part on the determination.

In some examples of the apparatus, the adjacent addresses for the volatile memory include column addresses in a same row of a bank in the volatile memory.

In some examples of the apparatus, the set of data may have a size that may be equal to or an integer multiple of the threshold size.

Another apparatus is described. The apparatus may include a non-volatile memory, a volatile memory configured to operate as cache for the non-volatile memory, a buffer coupled with the volatile memory, and an interface controller coupled with the non-volatile memory and the volatile memory, the interface controller operable to cause the apparatus to store, based at least in part on a received write command, a first data set in the buffer, determine whether a size of the first data set is smaller than a threshold size for accessing the volatile memory, and communicate, from the buffer to the volatile memory based at least in part on the write command and the size of the first data set being smaller than the threshold size, a set of data including the first data set and a second data set with a size smaller than the threshold size, the set of data having at least the threshold size.

In some examples of the apparatus, the interface controller may be operable to cause the apparatus to determine that the first data set and the second data set may be associated with adjacent addresses for the volatile memory, where the set of data may be communicated based at least in part on the determination.

In some examples of the apparatus, the interface controller may be operable to cause the apparatus to store the second data set in the buffer based at least in part on a second received write command, where the second data set may be stored in the buffer before the write command for the first data set may be received and determine than the size of the second data set may be smaller than the threshold size, where the set of data may be communicated based at least in part on the size of the second data set being smaller than the threshold size.

In some examples of the apparatus, the interface controller may be operable to cause the apparatus to communicate the second data set from the non-volatile memory to the buffer based at least in part on the first data set having a smaller size than the threshold size and the first data set and the second data set being associated with adjacent addresses for the volatile memory and store the second data set in the buffer before communicating the set of data from the buffer to the volatile memory.

In some examples of the apparatus, the interface controller may be operable to cause the apparatus to determine that data corresponding to the first data set may be absent from the volatile memory, where the first data set and the second data set may be communicated to the volatile memory based at least in part on the determination.

Another apparatus is described. The apparatus may include a non-volatile memory, a volatile memory configured to operate as cache for the non-volatile memory, a buffer coupled with the volatile memory, and an interface controller coupled with the non-volatile memory and the volatile memory, the interface controller operable to cause the apparatus to store, in the buffer based at least in part on a write command from a host device, a first data set associated with a first address of the volatile memory, store, in the buffer based at least in part on the first data set having a size smaller than a threshold size associated with the volatile memory, a second data set from the non-volatile memory, the second data set having a size smaller than the threshold size and associated with a second address of the volatile memory that is adjacent to the first address, and communicate, from the buffer to the volatile memory based at least in part on the write command, a set of data comprising the first data set and a second data set.

It should be noted that the methods described above describe possible implementations, and that the operations and the steps may be rearranged or otherwise modified and that other implementations are possible. Furthermore, portions from two or more of the methods may be combined.

If used to describe a conditional action or process, the terms "if," "when," "based on," "based at least in part on," and "in response to," may be interchangeable.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

A protocol may define one or more communication procedures and one or more communication parameters supported for use by a device or component. For example, a protocol may define various operations, a timing and a frequency for those operations, a meaning of various commands or signals or both, one or more addressing scheme(s) for one or more memories, a type of communication for which pins are reserved, a size of data handled at various components such as interfaces, a data rate supported by various components such as interfaces, or a bandwidth supported by various components such as interfaces, among other parameters and metrics, or any combination thereof.

Use of a shared protocol may enable interaction between devices because each device may operate in a manner expected, recognized, and understood by another device. For example, two devices that support the same protocol may interact according to the policies, procedures, and parameters defined by the protocol, whereas two devices that support different protocols may be incompatible.

To illustrate, two devices that support different protocols may be incompatible because the protocols define different addressing schemes (e.g., different quantities of address bits). As another illustration, two devices that support different protocols may be incompatible because the protocols define different transfer procedures for responding to a single command (e.g., the burst length or quantity of bytes permitted in response to the command may differ). Merely translating a command to an action should not be construed as use of two different protocols. Rather, two protocols may be considered different if corresponding procedures or parameters defined by the protocols vary. For example, a device may be said to support two different protocols if the device supports different addressing schemes, or different transfer procedures for responding to a command.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a non-volatile memory;
   a volatile memory configured to operate as a cache for the non-volatile memory;
   a buffer coupled with the volatile memory; and
   an interface controller coupled with the non-volatile memory and the volatile memory, the interface controller operable to cause the apparatus to:
   receive, from a host device, a write command for a first data set that is smaller than a threshold size associated with the volatile memory;
   store, based at least in part on the write command being for the first data set that is smaller than the threshold size associated with the volatile memory, the first data set in the buffer; and
   communicate, from the buffer to the volatile memory based at least in part on the write command, a set of data comprising the first data set from the buffer and a second data set from the buffer that is not associated with the write command, the set of data based at least in part on the first data set and the second data set being associated with adjacent addresses for the volatile memory and on the first data set and the second data set each being smaller than the threshold size associated with the volatile memory.

2. The apparatus of claim 1, wherein the threshold size comprises a minimum size of data for which metadata of the volatile memory is maintained, a minimum size of data for accessing the volatile memory, or a combination thereof.

3. The apparatus of claim 1, wherein the write command is associated with a first address for the volatile memory, and wherein the interface controller is further operable to cause the apparatus to:
   receive, from the host device, a second write command for the second data set, the second write command associated with a second address for the volatile memory; and
   determine whether the first data set and the second data set are associated with adjacent memory addresses for the volatile memory based at least in part on the first address and the second address.

4. The apparatus of claim 3, wherein the interface controller is further operable to cause the apparatus to:
   store the second data set in the buffer based at least in part on the second write command and before the write command for the first data set is received.

5. The apparatus of claim 1, wherein the interface controller is further operable to cause the apparatus to:
   communicate the second data set from the non-volatile memory to the buffer based at least in part on the first data set being smaller than the threshold size and the first data set and the second data set being associated with adjacent addresses; and
   store the second data set in the buffer before communicating the set of data from the buffer to the volatile memory.

6. The apparatus of claim 1, wherein the first data set and the second data set are associated with a same row in a bank of the volatile memory, and wherein the interface controller is further operable to cause the apparatus to:
receive, from the host device, a pre-charge command for the row, wherein the first data set and the second data set are communicated to the volatile memory before the pre-charge command is received.

7. The apparatus of claim 6, wherein the interface controller is further operable to cause the apparatus to:
communicate, from the buffer to the non-volatile memory, a third data set associated with the row of the volatile memory based at least in part on the pre-charge command and the third data set being smaller than the threshold size.

8. The apparatus of claim 1, wherein the interface controller is further operable to cause the apparatus to:
determine that data corresponding to the first data set is absent from the volatile memory, wherein the first data set and the second data set are communicated to the volatile memory based at least in part on the determination.

9. The apparatus of claim 1, wherein the adjacent addresses for the volatile memory comprise column addresses in a same row of a bank in the volatile memory.

10. The apparatus of claim 1, wherein the set of data has a size that is equal to or an integer multiple of the threshold size.

11. A method performed by a memory device, the method comprising:
receiving, from a host device, a write command for a first data set provided by the host device, the first data set being smaller than a threshold size associated with a volatile memory;
storing, based at least in part on the write command being for the first data set that is smaller than the threshold size associated with the volatile memory, the first data set in a buffer coupled with the volatile memory, the volatile memory configured to operate as a cache for a non-volatile memory; and
communicating, from the buffer to the volatile memory based at least in part on the write command, a set of data comprising the first data set from the buffer and a second data set from the buffer that is not associated with the write command, the set of data based at least in part on the first data set and the second data set being associated with adjacent addresses for the volatile memory and on the first data set and the second data set each being smaller than the threshold size.

12. The method of claim 11, wherein the threshold size comprises a minimum size of data for which metadata of the volatile memory is maintained, a minimum size of data for accessing the volatile memory, or a combination thereof.

13. The method of claim 11, wherein the write command is associated with a first address for the volatile memory, the method further comprising:
receiving, from the host device, a second write command for the second data set, the second write command associated with a second address for the volatile memory; and
determining whether the first data set and the second data set are associated with adjacent memory addresses for the volatile memory based at least in part on the first address and the second address.

14. The method of claim 13, further comprising:
storing the second data set in the buffer based at least in part on the second write command and before the write command for the first data set is received.

15. The method of claim 11, further comprising:
communicating the second data set from the non-volatile memory to the buffer based at least in part on the first data set being smaller than the threshold size and on the first data set and the second data set being associated with adjacent addresses; and
storing the second data set in the buffer before communicating the set of data from the buffer to the volatile memory.

16. The method of claim 11, wherein the first data set and the second data set are associated with a row of the volatile memory, the method further comprising:
receiving, from the host device, a pre-charge command for the row of the volatile memory, wherein the first data set and the second data set are communicated to the volatile memory before the pre-charge command is received.

17. The method of claim 16, further comprising:
communicating, from the buffer to the non-volatile memory, a third data set associated with the row of the volatile memory based at least in part on the pre-charge command and the third data set being smaller than the threshold size.

18. The method of claim 11, further comprising:
determining that data corresponding to the first data set is absent from the volatile memory, wherein the first data set and the second data set are communicated to the volatile memory based at least in part on the determination.

19. The method of claim 11, wherein the adjacent addresses for the volatile memory comprise column addresses in a same row of a bank in the volatile memory.

20. The method of claim 11, wherein the set of data has a size that is equal to or an integer multiple of the threshold size.

21. An apparatus, comprising:
a non-volatile memory;
a volatile memory configured to operate as cache for the non-volatile memory;
a buffer coupled with the volatile memory; and
an interface controller coupled with the non-volatile memory and the volatile memory, the interface controller operable to cause the apparatus to:
store, based at least in part on a received write command being for a first set of data that is smaller than a threshold size for accessing the volatile memory, the first data set in the buffer; and
communicate, from the buffer to the volatile memory based at least in part on the write command and the size of the first data set being smaller than the threshold size, a set of data comprising the first data set from the buffer and a second data set from the buffer that is not associated with the write command, the second data set being smaller than the threshold size, and the set of data being at least the threshold size.

22. The apparatus of claim 21, wherein the interface controller is operable to cause the apparatus to:
determine that the first data set and the second data set are associated with adjacent addresses for the volatile memory, wherein the set of data is communicated based at least in part on the determination.

23. The apparatus of claim 21, wherein the interface controller is operable to cause the apparatus to:
store the second data set in the buffer based at least in part on a second received write command, wherein the second data set is stored in the buffer before the write command for the first data set is received; and
determine that a size of the second data set is smaller than the threshold size, wherein the set of data is communicated based at least in part on the size of the second data set being smaller than the threshold size.

24. The apparatus of claim 21, wherein the interface controller is operable to cause the apparatus to:
communicate the second data set from the non-volatile memory to the buffer based at least in part on the first data set being smaller than the threshold size and the first data set and the second data set being associated with adjacent addresses for the volatile memory; and
store the second data set in the buffer before communicating the set of data from the buffer to the volatile memory.

25. The apparatus of claim 21, wherein the interface controller is operable to cause the apparatus to:
determine that data corresponding to the first data set is absent from the volatile memory, wherein the first data set and the second data set are communicated to the volatile memory based at least in part on the determination.

* * * * *